US012541750B1

(12) United States Patent
Kuyper

(10) Patent No.: US 12,541,750 B1
(45) Date of Patent: Feb. 3, 2026

(54) DYNAMIC AND DISTRIBUTED GATEWAY PLATFORM ARCHITECTURE FOR ACCESS TO FINANCIAL STRUCTURES

(71) Applicant: Openvest LLC, New York, NY (US)

(72) Inventor: Justin A Kuyper, New York, NY (US)

(73) Assignee: Openvest LLC, Mlami, FL (US)

( * ) Notice: Subject to any disclaimer, the term of this patent is extended or adjusted under 35 U.S.C. 154(b) by 0 days.

(21) Appl. No.: 17/896,749

(22) Filed: Aug. 26, 2022

(51) Int. Cl.
*G06Q 20/10* (2012.01)
*H04L 9/00* (2022.01)

(52) U.S. Cl.
CPC ............. *G06Q 20/102* (2013.01); *H04L 9/50* (2022.05); *H04L 2209/56* (2013.01)

(58) Field of Classification Search
None
See application file for complete search history.

(56) References Cited

U.S. PATENT DOCUMENTS

| | | | | |
|---|---|---|---|---|
| 12,039,559 B2* | 7/2024 | Cella | ..................... | G06N 20/00 |
| 12,132,267 B1* | 10/2024 | Duong | ................... | H04W 24/02 |
| 12,141,675 B1* | 11/2024 | Duong | ................... | H04B 7/024 |
| 12,143,941 B1* | 11/2024 | Duong | ................... | G06N 20/00 |
| 12,185,134 B1* | 12/2024 | Duong | ................... | H04W 24/02 |
| 2011/0047070 A1* | 2/2011 | Farias | ..................... | G06Q 40/02 |
| | | | | 705/40 |
| 2016/0012465 A1* | 1/2016 | Sharp | ..................... | G06Q 20/321 |
| | | | | 705/14.17 |
| 2017/0243213 A1* | 8/2017 | Castinado | ............. | H04W 12/06 |
| 2017/0372308 A1* | 12/2017 | Metnick | ................. | G06Q 20/12 |
| 2018/0197173 A1* | 7/2018 | Durvasula | .......... | G06Q 20/3823 |
| 2018/0218454 A1* | 8/2018 | Simon | ................... | H04L 9/3239 |
| 2020/0143459 A1* | 5/2020 | Simpson | ............ | G06Q 30/0641 |
| 2021/0166310 A1* | 6/2021 | Cella | ..................... | G06Q 10/10 |
| 2021/0201396 A1* | 7/2021 | Soundararajan | ..... | G06Q 20/388 |
| 2022/0405749 A1* | 12/2022 | Tartan | .................. | G06Q 20/065 |
| 2023/0105028 A1* | 4/2023 | Cella | .................... | G06F 16/2456 |
| | | | | 705/7.31 |
| 2023/0245156 A1* | 8/2023 | Cella | .................. | G06Q 30/0283 |
| | | | | 705/7.35 |
| 2024/0394390 A1* | 11/2024 | Lohar | ................. | G06F 21/6218 |

FOREIGN PATENT DOCUMENTS

| | | | | |
|---|---|---|---|---|
| CA | 2931469 A1 | * | 9/2017 | |
| CA | 2934603 C | * | 3/2019 | ........... G06Q 20/023 |
| CA | 3146014 A1 | * | 1/2020 | ............. G06Q 10/10 |
| WO | WO-2010045057 A1 | * | 4/2010 | ............. G06Q 20/10 |
| WO | WO-2016178999 A1 | * | 11/2016 | ............. G06Q 20/02 |
| WO | WO-2019086956 A1 | * | 5/2019 | ............. G06Q 20/02 |

* cited by examiner

*Primary Examiner* — Ayal I. Sharon
(74) *Attorney, Agent, or Firm* — PATENT LAW WORKS LLP

(57) ABSTRACT

An integrated dynamic access gateway to target financial structures is disclosed. The integrated dynamic access gateway presents a seamless "quick-click" user interface at the front end of a client-server architecture to users, by which they may allocate micro value amounts with their preferences. The micro value amounts are aggregated by preference to meet a threshold limit, for batch processing, and released and routed to diverse fund structures, upon a consensus and match by a decisioning engine. Digital transactions are recorded in blocks that are linked to create a trusted record. By the dynamic gateway interface, users can digitally direct value in real time.

20 Claims, 14 Drawing Sheets

DYNAMIC AND DISTRIBUTED GATEWAY PLATFORM ARCHITECTURE FOR ACCESS TO FINANCIAL STRUCTURES

BACKGROUND

1. Field of the Invention

The present invention relates generally to the field of financial and investment technologies ("FinTech"). In particular, the present invention relates to a dynamic gateway configured to continuously assemble micro-value amounts and designations by different users according to their allocation preferences to create pooled-value packets that may be deployed to various different financial structures. More particularly, the dynamic gateway provides a unified interface for aggregating micro-value amounts or digital transactions and enabling flow to macro-entities directing a macro value. This dynamic gateway provides users automatic and direct access to various investment and payment structures.

2. Description of the Related Art

In one aspect of finance, traditional and alternative investment financial structures are well known to protect and grow financial investments. Among these investment financial structures, long-term investment plans are typically implemented to provide for future security or retirement savings. For instance, a pension plan is an income arrangement that provides consumers deferred compensation upon retirement. Pension plans typically are employment-based and may be classified as defined benefits, defined contributions, or a combination of both. Defined benefit plans may be implemented based on a promise of an employer for a specific payout at retirement derived from the employee's salary and length of membership in the plan (e.g., Individual Retirement Accounts ("IRAs") and 401(k) plans) where predefined investments are periodically allocated from the employee's income. For defined contribution plans, employers and/or employees contribute funds during employment. The payout at retirement is based on the performance of the investment and the amount of compensation is uncertain. These types of financial structures are only available to those employed, and largely, in companies that offer such plans to their employees.

Most small businesses avoid an offer to their employees of a 401(k) or other retirement plan because the pricing structures are typically unfriendly to smaller enterprises. In addition, apart from typical 401(k) plans offered through employers, retirement plans and goals overwhelm most people. In the interest of diversification, there are a myriad investment options, choices, and employee-paid fees. It is clear that building financial security at any stage of life requires financial preparation, discipline, clearly-defined goals, and a plan of action.

Inexperienced investors do not see an immediate benefit of saving. Current techniques that allow an investor to save rarely provide the investor with quick and easy ways to route money to different established growth funds and access potential investment benefits in real-time.

Although savings are essential to financial security, many people do not have much and cannot cover unplanned expenses. Inflation-driven rising prices for essentials such as groceries and gasoline, hinder even more, the ability for most people to save money. Even if people are able to save micro amounts, there is no mechanism or structure for them to commit such micro amounts to high growth investment structures. It is well known that only those able to commit large or macro amounts have access to "sophisticated" financial structures, for example, private equity or alternative-investment funds. Such access is also via either personal or professional connections.

Moreover, federal government agencies, such as the Securities & Exchange Commission ("SEC") only allow accredited or "sophisticated" investors, defined by federal law as those who are "high-net worth" individuals or organizations and are presumed to understand the unique risks associated with alternative investment funds to invest in them. Navigating this universe of complex investments is challenging and requires in-depth understanding of experts to accurately gauge the risks and identify high-return potential opportunities. Therefore, access to most has only been available through pension funds that typically hire a group of knowledgeable financial advisors to serve as a gatekeeper to ensure that they understand the risks before allocating pension funds for investment. Besides pension funds, most people only have access to regulated mutual funds, or the like, through traditional financial advisors.

There are layers of compliance requirements imposed by the Securities & Exchange Commission, some in effect, and some proposed, to protect the interests of public investments in existing alternative investment funds, via pension and retirement funds. Notable universities also serve the public interest, via endowments that benefit from their investments in alternative investment strategies. Although there are some bad actors in this industry that have led to greater and more stringent compliance measures, most alternative investment managers, act in good faith, as their success is aligned with the success of the fund, by virtue of "performance fees" that they charge. To increase the pressure on these alternative investment funds would stifle emerging funds from surviving and prospering, not just for themselves, but for their investors. It should be recognized that investment strategies that result in decreased returns are generally temporary, and largely due to, market movements caused by external circumstances, such as domestic political acts, geopolitical events, natural disasters, corporate mismanagement, or the like, and not necessarily the fund managers. Therefore, restricting access to high growth strategies is not in the interest of empowering the micro investors to build their own future, especially as currently there does not exist a financial conduit that enables them to do.

In recent years, several trading platforms have emerged that offer technology to permit individual investors to open individual accounts and purchase stocks of their own choice. Such platforms have exploded in popularity, bringing a rush of new investors into the stock market, particularly younger, amateur traders. Such platforms have expanded access to financial markets, yet experts have expressed concern that these amateur investors lack sufficient safeguards and tend to fuel overly speculative trading, particularly in the case of "meme" stocks, cryptocurrencies, and derivatives. Often, investors, either uninformed or inexperienced, may purchase stocks based on viral trends or market frenzy, in the interest of quickly increasing their financial well-being, rather than with knowledge, concern, and care. Some trading platforms allow investors to broadly define their goals and recommend an alternative growth strategy directed to each investor's goals. These are limited and do not provide a wide variety of strategies to support the growing public investor needs.

Furthermore, an early example of a blockchain was a cryptocurrency. The cryptocurrency was generated when new blocks were created on the blockchain to confirm transactions of the cryptocurrency. The new blocks may confirm the transfer of cryptocurrency generated in earlier blocks. The blocks on the blockchain were cryptographically proofed by miners and linked to earlier blocks and served as an immutable record of the events in a trustless decentralized peer-to-peer network. For example, a cryptocurrency (e.g., bitcoin) is represented as a chain of events that transfers ownership from one party to another party on a blockchain without an intermediary. Each event transferring ownership from one party to another is cryptographically proofed by including the public key of the new owner. Also, each event is digitally signed with the current owner's private key. A new block in a blockchain is filled with cryptographically proofed events until the block reaches a specified size limit. A hash digest of all the event identifiers within the block and the block header of the previous block is added as the first event in the block. Each block of events is secured by a race between participants on a peer-to-peer network. In order to win the race, the participants collect new events to create the new block, validate the events on the new block by verifying the cryptographic proofs of each event, to verify the cryptocurrency was not spent earlier, and finally solve a mathematical puzzle based on the hash digest, previous block header, and a random number. Blockchain provides a mathematical hierarchy of verifiable events that is immutable and is verified at each stage by the race between the participants, called miners. Given the resources wasted in this approach, other consensus protocols have been proposed to secure the blocks instead of the cryptographic race. Examples of consensus protocols in use include proof of work, proof of useful work, proof of stake, and the like.

After blockchain was applied for cryptocurrency, the principles used in the early blockchain were modified to allow execution of "smart contracts" deployed on the blockchain. Smart Contracts are self-executing machine-readable instructions that can store state information and are stored on the blockchain. When deployed, the smart contract is assigned a unique address to allow communication to and from the smart contract through messages. The smart contract is deployed by storing the smart contract as an event on the blockchain. Messages to the smart contract may be posted as events on the blockchain. The smart contract may contain machine-readable instructions and data designed to execute on virtual machines. The smart contract may have the ability to read or write to its internal storage storing data, read the storage of a received message, and send messages to other smart contracts to trigger execution of the code in other distributed applications. When the smart contract is executed on a virtual machine running on the peers securing the blockchain, the resulting data may be saved in the internal storage of the smart contract. The updated smart contract may be stored as an event on a new block. Thus, the smart contract and changes to data, i.e., state of the smart contract, are represented as a series of events on the blockchain. In the cryptocurrency blockchain, each block in the blockchain occurs, by mining the blockchain by peers based on a consensus protocol.

Many blockchain implementations have emerged. Support for smart contracts varies in the different blockchains that are currently available. Even among the blockchain implementations that support smart contracts, the available features vary. Yet, using smart contracts and the blockchain poses technical challenges for even the savviest participants. For example, the current block in the blockchain contains events that were received by a peer within a certain period. Therefore, the blocks may contain random events, without any relationship to each other. Similarly, the events may relate to smart contracts or other smart contracts that are present in previous blocks in the blockchain. And, the smart contracts are typically identified by an identifying address or number, stored in a block of the blockchain. Identity of a user tied to the identifying address or number is not disclosed with a deliberate intent to keep users anonymous.

In addition, the smart contract is packed into blocks optimized to meet block size limitations for retrieval. The smart contract stored on the block may be difficult to locate because of the lack of organization of the events recorded in each block. Also, different smart contract versions may be stored in multiple blocks, often on incompatible blockchain implementations (e.g., hard-forks). Similarly, events on the blockchain may be secured with cryptographic keys to interact with the smart contract. Furthermore, blockchain enterprise applications are difficult to implement because they require knowledge of cryptography, knowledge of peer-to-peer systems, and knowledge of specialized languages used in blockchain smart contracts, which prevents people with enterprise expertise from building applications on the blockchain. Other technical issues associated with blockchains include interfacing an application on the blockchain to already existing technologies, such as reporting functions, analytics, databases, data storage, artificial intelligence and the like. Therefore, there are many disadvantages and pitfalls.

Thus, a dire need exists for improved ways to expand access for micro users or investors as well as institutional investors, to established and emerging, innovative, alternative investment structures, traditional financial structures, and philanthropic structures, via a distributed conduit that facilitates a seamless experience for users and effective and trusted processing and delivery of aggregated micro funds to a macro destination.

SUMMARY

The present invention overcomes the deficiencies and limitations of prior systems and methods, at least in part by, providing a novel conduit that integrates access for all types of users, from a micro user to an institution, via a multi-layered and distributed architecture, designed to continuously process and deliver aggregated micro value to financial destinations. This conduit provides fair access to all people and institutions interested in investing fractional or micro amounts of money in financial structures that are committed to investment of macro amounts of money. The platform serves as a dynamic transaction gateway that provides the micro investors/users with a unified interface with "quick-click" options that facilitate innovative access points to premier funds across the industry. This offers micro investors access with micro investment amounts. The target financial structures may vary and include structures with a long-term strategic vision, as well as short-term structures with a nimble, opportunistic vision or an index fund designed to follow market movements. The financial structures may also solicit contributions to philanthropic interests. The novel user interface allows the user to deploy micro value amounts with a few clicks in real time.

In accordance with one embodiment of this technology, micro amounts from individual investors are received, recorded, and assembled to meet a set threshold amount, for batch processing as a single pooled value packet. These value packets are dynamically and continuously created based on user-preference allocations. Users may allocate value (payments or funds) to any one of a number of institutional or private offerings. Each batch is formulated and recorded in a block in a database accessible to only a pool of authorized parties to validate the block. Each batch or block, when filled and validated, may be linked by a decisioning engine to a target financial structure. The decisioning engine considers the terms and conditions of the target financial structure with the batch preference identifier for each batch of value to determine a match status. A match status automatically generates a trigger signal for automatic release of the batch for routing to the target financial structure processor. A macro-fund amount corresponding to the batch threshold amount is requested for transfer from the financial entity where the micro amounts are aggregated.

In accordance with yet another embodiment of the invention, micro investors may simply download or access a platform application, on their respective devices, and input control actions, via a "quick-click" user-friendly and seamless user interface, configured to guide each micro investor, via screen prompts and displays, to indicate their respective preferences and selections.

In accordance with another embodiment of this technology, macro-batch fund amounts are assembled according to similar user preferences and routed to a selected one of various target financial structures, for investment allocation. A selected target financial structure is indicated by the trigger signal, which concurrently enables release of the particular macro-batch fund amount.

In accordance with yet another embodiment of this invention, a micro-investor-account-generation engine, in the user interface opens an account for each micro investor, and creates a profile, dynamically updating the profile, as necessary, with each access attempt by an investor. In one embodiment, the micro-investor may provide identification data to create an identity on the platform. The identification data may comprise, but not limited to, user name and password, a finger-print scan, facial-recognition, or the like.

In accordance with another embodiment of this technology, a central macro-vault processor receives the various micro amounts from different users. By executing preference search functions, the micro amounts are periodically separated into preference-macro vaults, each designated by a unique identifier. The results of each preference search function trigger an aggregator function to execute a computation function until reaching a designated threshold amount. When the designated threshold amount is reached, the preference-macro vault is marked for release.

In some embodiments, a batch-designation engine, assigns a unique batch number for each record of a macro-fund packet created, which records an indication of each micro user profile and micro allocated amount. There is a list of contributors for each batch. The batches are prepared sequentially for release.

In some embodiments, interested macro-fund structures may provide their terms and conditions, which are matched to user preferences, by either a direct match based on evaluating if interests align or by bidding operations.

In accordance with yet another embodiment of this technology, a macro-fund router, identifies the selected target financial structure, by the trigger signal received, and dispatches each macro-fund amount to its destination.

In accordance some embodiments of the dynamic-transaction gateway interface, users may digitally allocate their fractional or micro amounts to multiple financial structures by indicating their personal preferences (if they have prior knowledge of the financial structures). Alternatively, the dynamic gateway or integrated platform is configured to make selections based on tracking current status reports to the SEC and making recommendations.

BRIEF DESCRIPTION OF THE DRAWINGS

The present invention is illustrated by way of example, and not by way of limitation, in the figures of the accompanying drawings, in which like reference numerals generally indicate identical, functionally similar, and/or structurally similar elements, and wherein.

DETAILED DESCRIPTION

The following description demonstrates various illustrative embodiments of the present invention with reference to the accompanying drawings. It should be understood that other embodiments may be utilized and structural and functional modifications may be made without departing from the scope of the present invention. This invention may be practiced or carried out in various ways. Also, it is to be understood that the phraseology and terminology that is used here are for the purpose of description and should not be regarded as limiting. Rather, the phrases and terms used here are to be given their broadest interpretation and meaning. The use of "including" and "comprising" and variations thereof, is meant to encompass the items listed thereafter and equivalents thereof as well as additional items and equivalents thereof. The use of the terms "connected," "coupled," "engaged" and similar terms, is meant to include both direct and indirect connecting, coupling, and engaging.

One or more aspects of the invention may be embodied in computer-usable or readable data and/or computer-executable instructions, such as in one or more program modules, executed by one or more computers or other devices as described herein. Generally, program modules include routines, programs, objects, components, data structures, etc., that perform particular tasks or implement particular abstract data types when executed by a processor in a computer or other device. The modules may be written in a source code programming language that is subsequently compiled for execution, or may be written in a scripting language, such as, but not limited to, HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

Figure 1:
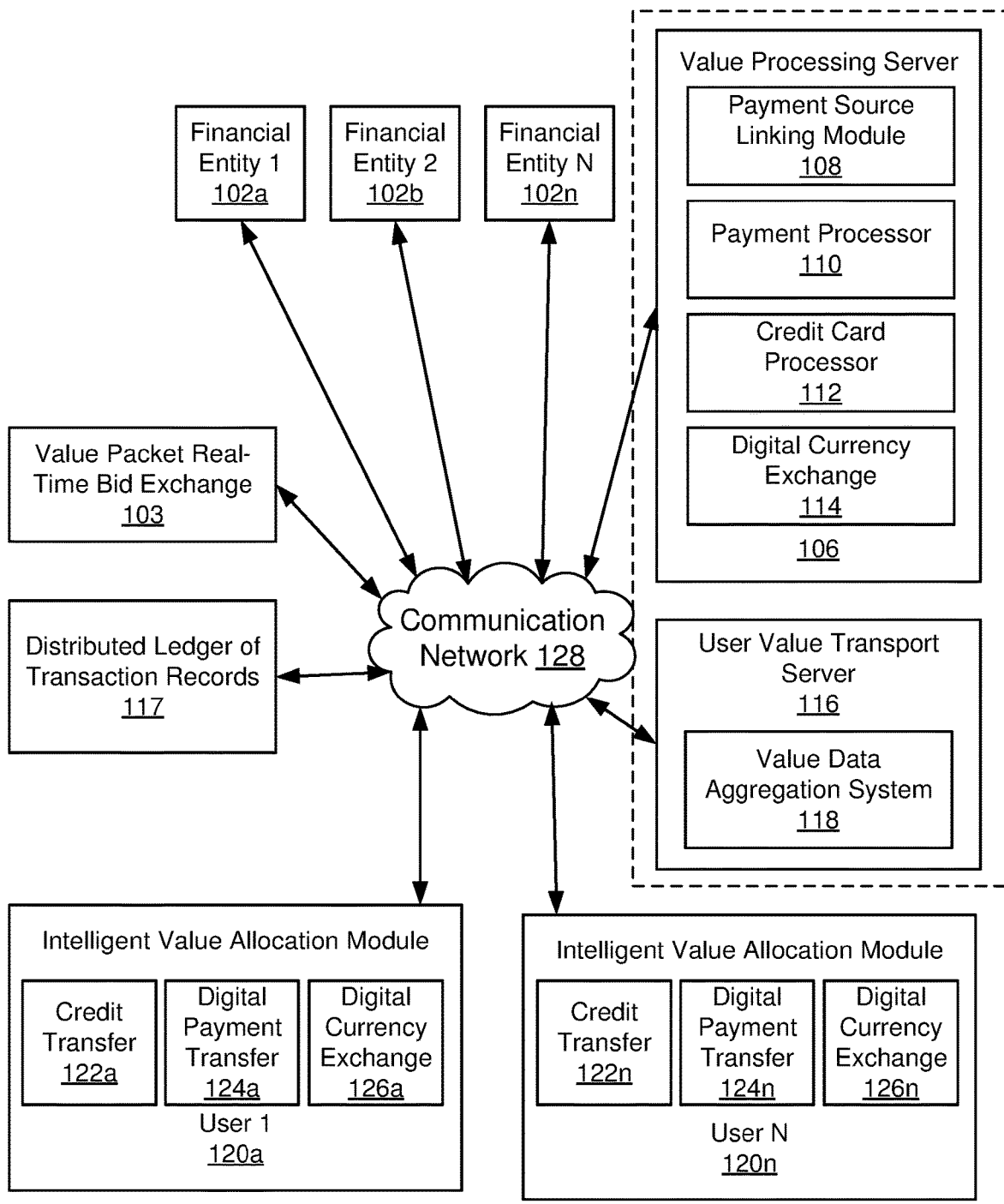
FIG. 1 is a block diagram illustrating one embodiment of the dynamic gateway configured to provide access to financial structures in accordance with the present invention.

Referring now to FIG. 1, a distributed network environment in which the invention operates is illustrated. The dynamic gateway 100 as illustrated has a client-server architecture that provides application software ("intelligent value allocation module") on the client side that may be downloaded on user devices 120a through 120n or accessed via a browser on a website. For the purposes of illustration, only two user devices are illustrated, but it should be recognized by those skilled in the art, that this illustration is by way of example, and represents many hundreds, thousands, or millions of electronic devices (mobile, desktops, or others) used by people all over the globe to access the application software via an application programming interface ("API"). Users may typically gain access to the dynamic gateway 100 by downloading this application software, the "intelligent" value allocation module or tool, on their respective user devices 120a through 120n, or access this module on a system website via browsers on their respective devices. This intelligent value allocation module provides "quick click" options for the users to provide a seamless experience, after they have set up their initial profiles with the gateway system.

In brief overview, the distributed network environment shows one or more user machines or devices that are used by the users, otherwise referred to as clients or customers, designated by reference numerals 120a-120n (also generally referred to as user machine 120a-n, user or client 120a-n, user or client node 120a-n, user or client machine 120a-n, user or client computer 120a-n, user or client device 120a-n, endpoint 120a-n, or endpoint node 120a-n) in communication with one or more remote gateway machines 106/116 (also generally referred to as a dynamic gateway server 106/116 or remote machines 106/116). The illustrated machines or servers communicate via one or more communication networks, described here as a communication network 128. The dynamic gateway in the environment 100 is shown within broken lines and may be implemented in a distributed architecture or not. For ease of explanation, the dynamic gateway comprises at least two servers, the first, a value-processing server 106, and the second, a use value transport server 116. Although these structures are described as servers, they may alternatively be referred to as systems or platforms.

In some embodiments, the user device 120a-n (for users 1-N) may function as a client node, seeking access to resources provided by a server and in some instances as a server providing access to hosted resources for other clients 120a through 120n.

Although FIG. 1 shows a communication network 128 between the user machines 120a-120n and the remote machines 106 or 116, the user machines 120a-n and the remote machines 106 or 116 may be on the same network 128. The communication network 128 may be a local-area network (LAN), such as a company Intranet, a metropolitan area network (MAN), or a wide area network (WAN), such as the Internet or the World Wide Web. In some embodiments, there are multiple networks 128 between the user machines 120a-120n and the remote machines 106 or 116. In one of these embodiments, the communication network 128 may be a private network. In yet another embodiment, the communication network 128 may be a public network. In another of these embodiments, a communication network 128 may be a private network and a public network.

The communication network 128 may be any type and/or form of network and may include any of the following: a point-to-point network, a broadcast network, a wide-area network, a local-area network, a telecommunications network, a data-communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the communication network 128 may comprise a wireless link, such as an infrared channel or satellite band. The topology of the communication network 128 may be a bus, star, or ring network topology. The communication network 128 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In some embodiments, the dynamic gateway may include multiple, logically-grouped remote machines 106 and 116. In one of these embodiments, the logical group of remote machines may be configured as a server farm ("back-end" servers). In another of these embodiments, the remote machines 106 and 116 may be geographically dispersed. In other embodiments, a server farm may be administered as a single entity. In still other embodiments, the server farm comprises a plurality of server farms. The remote machines 106 and 116 within each server farm may be heterogeneous-one or more of the remote machines 106 and 116 can operate according to one type of operating system platform (e.g., WINDOWS NT, WINDOWS 2003, WINDOWS 2008, WINDOWS 7 and WINDOWS Server 2008 R2, all of which are manufactured by Microsoft Corp. of Redmond, Wash.), while one or more of the other remote machines 106 and 116 can operate on according to another type of operating system platform (e.g., Unix or Linux).

The remote machines 106 and 116 of each server farm may not be physically proximate to another remote machine 106 or 116 in the same server farm. The group of remote machines 106 or 116 logically grouped as a server farm may also be interconnected using a wide-area network ("WAN") connection or a metropolitan-area network ("MAN") connection. For example, a server farm may include remote machines 106 or 116 physically located in different continents or different regions of a continent, country, state, city, campus, or room. Data transmission speeds between remote machines 106 or 116 in the server farm can be increased if the remote machines 106 or 116 are connected using a local-area network (LAN) connection or some form of direct connection.

A remote machine 106 or 116 may be a file server, application server, web server, proxy server, appliance, network appliance, gateway, application gateway, gateway server, virtualization server, deployment server, SSL VPN server, or firewall. In some embodiments, a remote machine 106 or 116 may provide a remote authentication dial-in user function, and is referred to as a RADIUS server. In other embodiments, a remote machine 106 or 116 may have the capacity to function as either an application server or as a master application server. In yet other embodiments, a remote machine 106 or 116 may be a blade server. In yet other embodiments, a remote machine 106 or 116 executes a virtual machine providing, to a user or client computer 120a to 120n, access to a computing environment.

In one embodiment, a remote machine 106 may include an Active Directory. The remote machine 106 may be an application acceleration appliance. For embodiments in which the remote machine 106 is an application acceleration appliance, the remote machine 106 may provide functionality including firewall functionality, application firewall functionality, or load balancing functionality. In some embodiments, the remote machine 106 may comprise an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

In some embodiments, a remote machine 106 executes an application on behalf of a user of a user machine 120a-n. In other embodiments, a remote machine 106 executes a virtual machine, which provides an execution session within which applications execute on behalf of a user of a user machine 120a-n. In one embodiment, the execution session provides access to a computing environment, which may comprise one or more of: an application, a plurality of applications, a desktop application, and a desktop session in which one or more applications may execute.

A user machine 120 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on user machine 120a-n.

The user machine 120a-n and remote machine 106 may be deployed as and/or executed on any type and form of computing device, such as a computer, network device or appliance capable of communicating on any type and form of network and performing the operations described herein. The user machine 120a-120n may include a digital user wallet, by which the user may transfer value (fiat currency or cryptocurrency). A user may allocate value to a cause or purpose by either a credit-card transfer 122a, a digital-payment transfer 124a (including a bank transfer using a SWIFT or other code known in the banking industry), or a digital currency exchange 126a (some countries are starting a form of digital currency). On each of the devices 120a through 120n, the wallets may have transfer mechanisms to execute transfer of value.

The value processing server 106 (referred to a "machine 106") comprises a payment source linking module 108, a payment processor 110, a credit card processor 112, and a digital currency exchange 114. The use value transport server 116 comprises a value data aggregation system 118. The dynamic gateway system 100 further comprises an array of financial entities or structures 1 through N (to represent many different financial entities) uniquely identified to the dynamic gateway system 100 by unique identifiers, designated by reference numerals 102a, 102b, and 102n herein. A distributed ledger of transaction records 117 connects via the communication network 128 to the dynamic gateway and records all "immutable" records of transactions once consensus by appropriate parties for the records is reached. The distributed ledger although shown separately may be configured to be a part of the dynamic gateway. As illustrated, a value packet real-time bid exchange 103 may be a platform with a decisioning engine 219 (FIG. 2A) that determines a match for each aggregated value packet that is released from the user value transport server 116. The financial entities 102a, 102b, through 102n may bid for value packets by responding to requests received from the user value transport server 116 for value packets that are designated ready for release. In some embodiments, the financial entities may otherwise respond instead of by bids, to the requests from the user value transport server 116. In some embodiments, the user value transport server may receive external events that inform on best growth performance and may send a solicitation request offering value data packets to the financial entities that have accomplished best growth results.

Figure 2A:
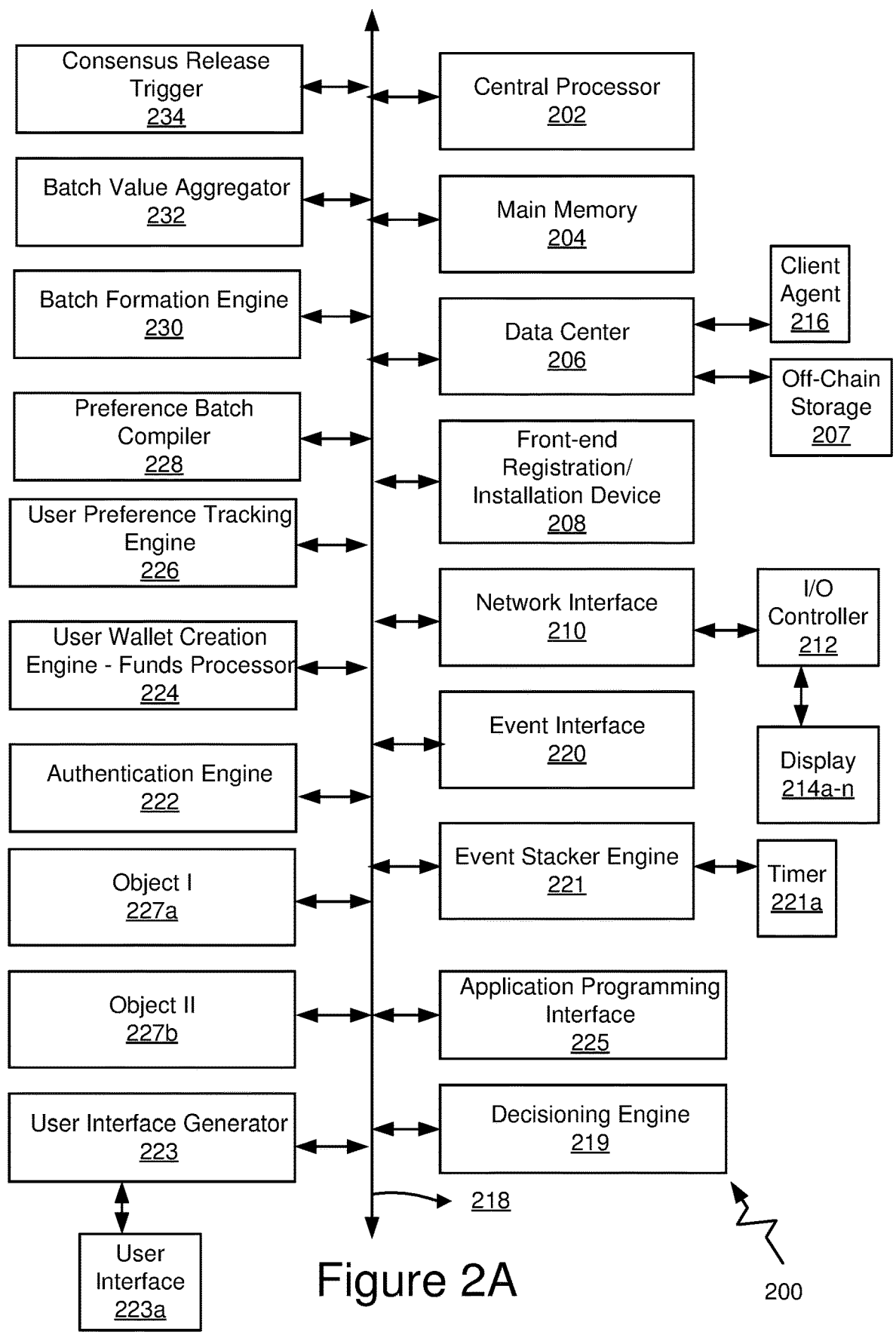
FIG. 2A is a block diagram of the hardware and software modules and various engines in the dynamic gateway.
Figure 2B:
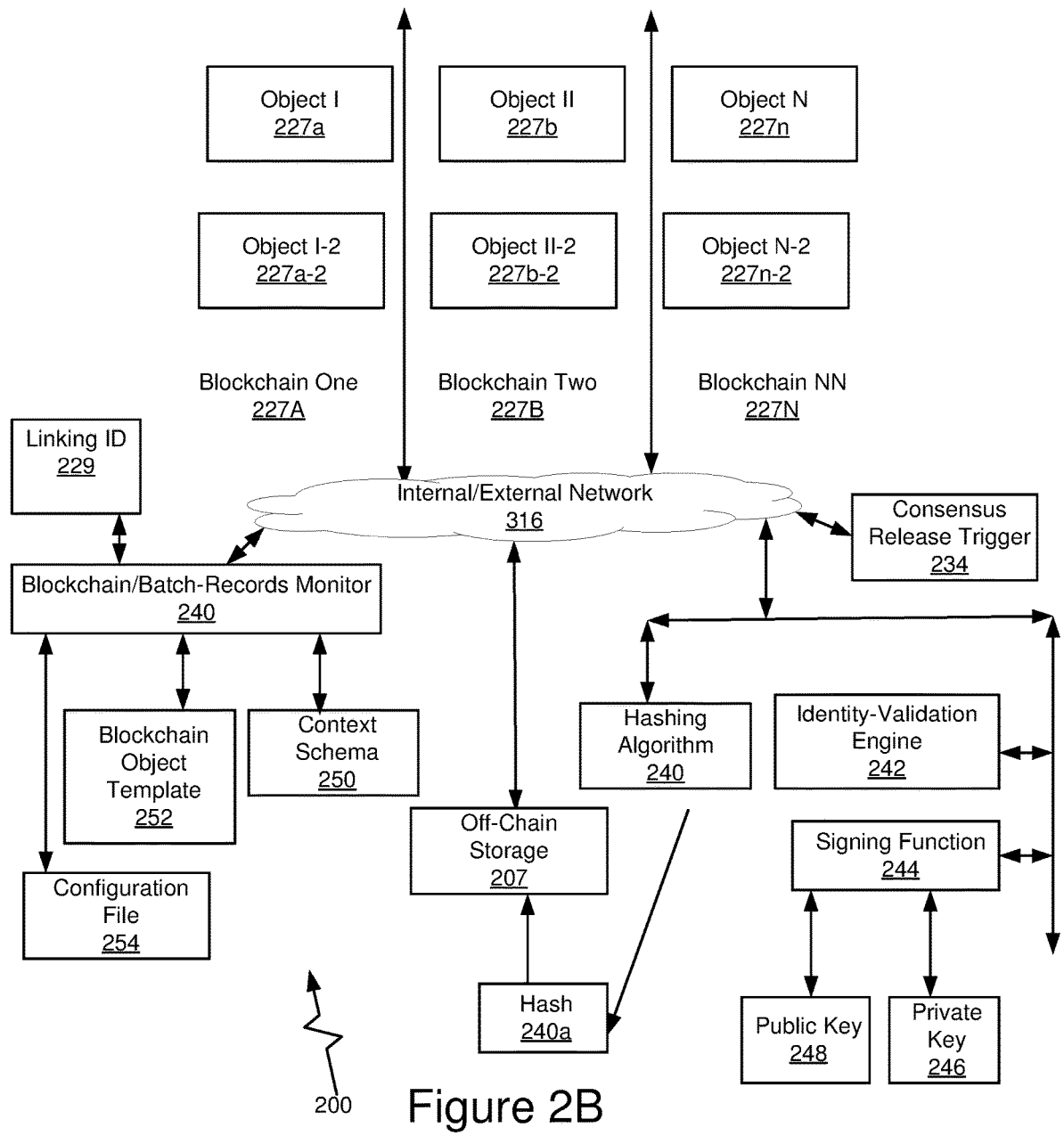
FIG. 2B is a block diagram illustrating the blockchains created to record digital value transactions.

Referring now to FIGS. 2A and 2B, each computing device 106/116 includes a central processing unit or processor 202, and a main memory unit 204. The computing device 106/116 may include a storage device or data center 206, a front-end registration (including an installation device) 208, a network interface 210, I/O controller 212, and display devices 214a-n. The display devices 214a-n are presentation component(s) to present data indications to a participant or other device. Examples of presentation components include a display device, speaker, printing component, vibrating component, etc.

The storage device is a data center 206 may include, without limitation, an operating system, software, and a client agent 216. Each computing device may also include additional optional elements, such as a memory port, a bridge, one or more input/output devices and a cache memory in communication with the central processor 202.

Figure 7:
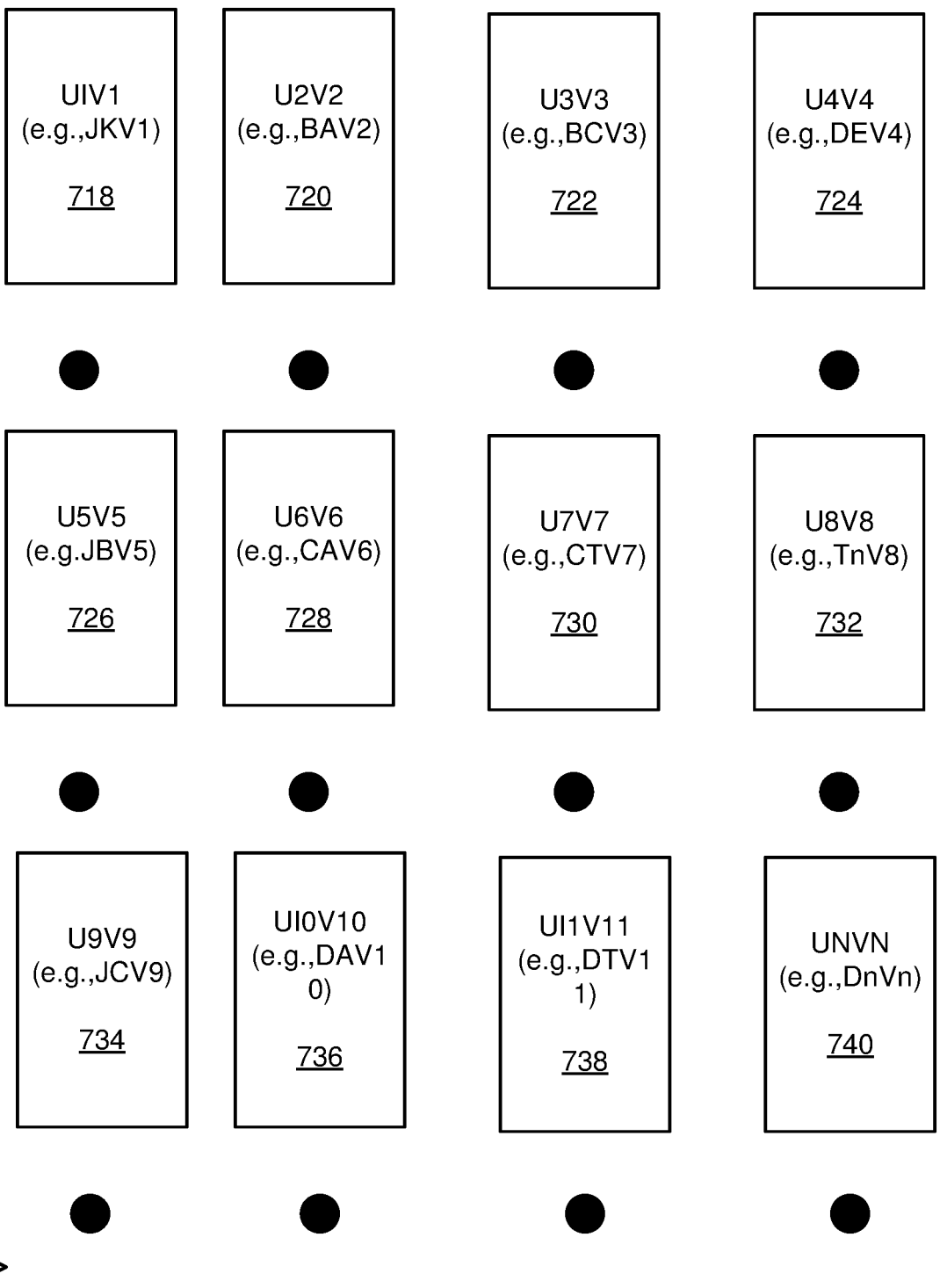
FIG. 7 is a diagrammatic illustration of user profile nodes created to formulate a value map network.

The data center 206 illustrates a data center comprising a plurality of nodes, such as nodes illustrated in FIG. 7 (e.g., 718, 720 etc.). In some embodiments, one or more virtual machines may run on nodes of data center 206. In some embodiments, a single virtual machine may be implemented on a single node of data center 206, or any number of virtual machines may be implemented on any number of nodes of the data center in accordance with illustrative embodiments of the disclosure. Generally, a virtual machine is allocated to role instances of a modular-application, or function application, based on demands (e.g., amount of processing load) placed on the modular-application. As used herein, the phrase "virtual machine" is not meant to be limiting, and may refer to any software, application, operating system, or program that is executed by a processing unit to underlie the functionality of the role instances allocated thereto. Further, a virtual machine may include processing capacity, storage locations, and other assets within the data center to properly support the allocated role instances.

In operation, the virtual machines are dynamically assigned resources on a first node and second node of the data center, and endpoints (e.g., the role instances) are dynamically placed on the virtual machines to satisfy the current processing load. In one instance, a fabric controller is responsible for automatically managing the virtual machines running on the nodes of the data center 206 and for placing the role instances and other resources (e.g., software components) within the data center 206. By way of example, the fabric controller may rely on a function model (e.g., designed by a customer that owns the function application) to provide user interface on how, where, and when to configure the virtual machines, such as virtual machine, and how, where, and when to place the role instances thereon.

As discussed above, the virtual machines may be dynamically established and configured within one or more nodes of a data center. As illustrated herein, the nodes illustrated in FIG. 7 may be any form of computing devices, such as, for example, a personal computer, a desktop computer, a laptop computer, a mobile device, a consumer electronic device, server(s), and the like. In one instance, the nodes host and support the operations of the virtual machines, while simultaneously hosting other virtual machines carved out for supporting other tenants of the data center 206, such as internal functions and hosted functions. Often, the role instances may include endpoints of distinct function applications owned by different customers.

Typically, each of the nodes includes, or is linked to, some form of a computing unit (e.g., a central processing unit, microprocessor, etc.) to support operations of the component(s) running thereon. As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the nodes to enable each device to perform a variety of processes and operations. In another instance, the computing unit may encompass a processor (not shown) coupled to the computer readable medium (e.g., computer storage media and communication media) accommodated by each of the nodes.

The role instances that reside on the nodes support the operation of function applications and may be interconnected via application programming interfaces (APIs). In one instance, one or more of these interconnections may be established via a network cloud, such as public network. The network cloud serves to interconnect resources, such as the role instances, which may be distributable placed across various physical hosts, such as nodes described here. Also, the network cloud facilitates communication over channels connecting the role instances of the function applications running in the data center 206. By way of example, the network cloud may include, without limitation, one or more local area networks (LANs) and/or wide area networks (WANs). Such networking environments are commonplace in offices, enterprise-wide computer networks, intranets, and the internet. Accordingly, the network is not further described herein.

The central processor 202 is any logic circuitry that responds to and processes instructions fetched from the main memory unit 204. In many embodiments, the central processor 202 is provided by a microprocessor unit, for example: ones manufactured by Intel Corporation of Mountain View, Calif.; ones manufactured by Motorola Corporation of Schaumburg, Ill.; ones manufactured by Transmeta Corporation of Santa Clara, Calif.; ones manufactured by International Business Machines of White Plains, N.Y.; or ones manufactured by Advanced Micro Devices of Sunnyvale, Calif. The computing device 106 or 116 may be based on any of these processors, or any other processor capable of operating as described herein.

Main memory 204 may be one or more memory chips capable of storing data and allowing any storage location to be directly accessed by the microprocessor in the central processor 202, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 204 may be based on any of the above-described memory chips, or any other available memory chips capable of operating as described herein. The central processor 202 communicates with the main memory 204 via a system bus 218. The central processor 202 communicates directly with main memory 204 via a memory port. For example, the main memory 204 may be DRDRAM. In some instances, the central processor 202 communicates directly with cache memory via a secondary bus, sometimes referred to as a backside bus. In other embodiments, the central processor 202 communicates with cache memory using the system bus 218. The cache memory typically has a faster response time than main memory 204 and is typically provided by SRAM, BSRAM, or EDRAM. In some instances, the central processor 202 communicates with various I/O devices via the local system bus 218. Various buses may be used to connect the central processor 202 to any of the I/O devices, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display, the central processor 202 may use an Advanced Graphics Port (AGP) to communicate with the display 214a-n.

In some embodiments, the central processor 202 communicates directly with I/O devices via an I/O controller 212, via HYPERTRANSPORT, RAPIDIO, or INFINIBAND communications technology. Local buses and direct communication may be mixed: the processor 202 communicates with I/O device using a local interconnect bus while communicating with I/O device directly. A wide variety of I/O devices may be present in the computing device 106/116. Input devices may include keyboards, mice, trackpads, trackballs, microphones, and drawing tablets. Output devices may include video displays, speakers, inkjet printers, laser printers, and dye-sublimation printers (collectively shown as a display 214a-n). The I/O controller 212, as shown, may control the I/O devices. The I/O controller 212 may control one or more I/O devices such as a keyboard and a pointing device, e.g., a mouse or optical pen. Furthermore, an I/O device may also provide storage and/or an installation medium for the machines 106/116. In still other embodiments, the computing device 106/116 may provide USB connections (not shown) to receive handheld USB storage devices such as the USB Flash Drive line of devices manufactured by Twintech Industry, Inc. of Los Alamitos, California. The machines 106/116 may support any suitable installation device, for example, a USB device, hard-drive or any other device suitable for installing software and programs. The machines 106/116 may further comprise a storage device, such as one or more hard disk drives or redundant arrays of independent disks, for storing an operating system and other related software, and for storing application software programs such as any program related to a client agent 216. Optionally, any of the installation devices may also be used as the storage device. Additionally, the operating system and the software may be run from a bootable medium, for example, a bootable CD, such as KNOPPIX, a bootable CD for GNU/Linux that is available as a GNU/Linux distribution from knoppix.net.

The machines 106/116 may include a network interface 210 to interface to the communication network 128 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing machines 106/116 communicate with other computing devices via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 210 may comprise a built-in network adapter, network interface card, PCMCIA network card, card bus network adapter, wireless network adapter, USB network adapter, modem or any other device suitable for interfacing the computing device 106/116 to any type of network capable of communication and performing the operations described herein.

In some embodiments, the communication network 128 may include a cloud computing environment for one or more components of the dynamic gateway. The one or more components of the dynamic gateway may use one or more components as shown in FIGS. 2A and 2B to create one or more functions described in further detail here. The one or more functions of the dynamic gateway may generate a blockchain object, deploy a blockchain object, interface with a blockchain object and manage a blockchain object. The architecture 200 of the dynamic gateway should not be interpreted as dependent on or requiring any single component or combination of components illustrated here. Also, any number of nodes, virtual machines, data centers, role instances, or combinations thereof, may be employed to achieve the desired functionality within the scope of embodiments of the present disclosure.

The distributed computing environment coupled by the communication network. 128 may include a public network, a private network, or a dedicated network. Public network may be a public cloud, for example. A private network may be a private enterprise network or private cloud, while a dedicated network may be a third-party network or dedicated cloud. In some applications, a private network may host a customer data center, and a dedicated network may host an internet function provider. A hybrid cloud may include any combination of a public network, a private network, and a dedicated network. For example, a dedicated network may be optional, with hybrid cloud comprised of a public network and a private network. In some embodiments, a public network may include data centers configured to host and support operations, including tasks of a generating, deploying, interfacing, and managing the blockchain object, according to embodiments of the current disclosure. It may be understood and appreciated that the storage device or data center 206 is one embodiment of a data center implementation for accommodating one or more applications and is not intended to suggest any limitation as to the scope of use or functionality of embodiments of the present disclosure. Neither should data center 206 be interpreted as having any dependency or requester related to any single resource, combination of resources, combination of servers, or combination of nodes (e.g., nodes in FIG. 7), or set of APIs to access the resources, servers, and/or nodes.

The storage device 206 illustrates a data center comprising a plurality of servers, which may store data as designated. A fabric controller is responsible for automatically managing the servers and distributing tasks and other resources within the data center. By way of example, the fabric controller may rely on a function model (e.g., designed by a customer that owns the modular-application) to provide an interface on how, where, and when to configure server and how, where, and when to place applications thereon. In one embodiment, one or more role instances of a modular-application may be placed on one or more of the servers of data center 206, where the one or more role instances may represent the portions of software, component programs, or instances of roles that participate in the blockchain object application manager application. In another embodiment, one or more of the role instances may represent stored data that is accessible to the blockchain object application manager.

In some embodiments, the computing machine 106/116 may comprise or be connected to multiple display devices, which each may be of the same or different type and/or form. Any of the I/O devices and/or the I/O controller 212 may comprise any type and/or form of suitable hardware, software, or combination of hardware and software to support, enable or provide for the connection and use of multiple display devices by the computing device 106/116. For example, the computing device 106/116 may include any type and/or form of video adapter, video card, driver, and/or library to interface, communicate, connect or otherwise use the display devices 214*a-n*.

In further embodiments, an I/O device may serve as a bridge between the system bus 218 and an external communication bus, such as a USB bus, an Apple Desktop Bus, an RS-232 serial connection, a SCSI bus, a FireWire bus, a Fire Wire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

The computing machines 106/116 of the sort depicted here typically operate under the control of operating systems, which control scheduling of tasks and access to system resources. The computing machines 106/116 may run any operating system such as any embedded operating system, any real-time operating system, any open-source operating system, any proprietary operating system, any operating systems for mobile computing devices, or any other operating system capable of running on the computing device and performing the operations described herein. The computing machines 106/116 may be any workstation, desktop computer, laptop or notebook computer, server, handheld computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein.

In some embodiments, the computing machines 106/116 may comprise multiple processors and may provide functionality for simultaneous execution of instructions or for simultaneous execution of one instruction on more than one piece of data. In some embodiments, the computing machines may comprise a parallel processor with one or more cores. In one of these embodiments, the computing machines may comprise a shared memory parallel device, with multiple processors and/or multiple processor cores, accessing all available memory as a single global address space. In another of these embodiments, the computing machines may comprise a distributed memory parallel device with multiple processors each accessing local memory only. In still another of these embodiments, the computing machines have both some memory which is shared and some memory which may only be accessed by particular processors or subsets of processors. In yet another of these embodiments, the computing machines, such as a multicore microprocessor, combine two or more independent processors into a single package, often a single integrated circuit (IC). In yet another of these embodiments, the computing device includes a chip having a CELL BROADBAND ENGINE architecture and including a Power processor element and a plurality of synergistic processing elements, the Power processor element and the plurality of synergistic processing elements linked together by an internal high-speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

In one embodiment, a resource may be a program, an application, a document, a file, a plurality of applications, a plurality of files, an executable program file, a desktop environment, a computing environment, or other resource made available to a user of the user computing device. The resource may be delivered to the user computing device via a plurality of access methods including, but not limited to, conventional installation directly on the user computing device, delivery to the user computing device via a method for application streaming, delivery to the user computing device of output data generated by an execution of the resource on a third computing device and communicated to the user computing device via a presentation layer protocol, delivery to the user computing device of output data generated by an execution of the resource via a virtual machine executing on a remote computing device, or execution from a removable storage device connected to the user computing device, such as a USB device, or via a virtual machine executing on the user computing device and generating output data. In some embodiments, the user computing device transmits output data generated by the execution of the resource to another client computing device.

In some embodiments, a user of a user computing device connects to a remote computing device and views a display on the user computing device of a local version of a remote desktop environment, comprising a plurality of data objects, generated on the remote computing device. In one of these embodiments, at least one resource is provided to the user by the remote computing device (or by a second remote computing device) and displayed in the remote environment.

FIG. 2A also illustrates an event interface 220, an evestacker engine 221, and a timer 221a, which provides the timing for various operations, such as designating a time sequence to each event as it occurs and is received at the system, for packet formation and routing of allocated amounts to their destinations etc. In some embodiments, the event interface facilitates generation, deployment, and management of events in blockchain objects (or batch objects for a particular batch), which are deployed sequentially. For example, a first set of blockchain objects (batch objects) may be deployed on a first blockchain and a second set of blockchain objects may be deployed on a second blockchain based on a context schema. The event interface 220 provides an interface between events that may affect the first blockchain object on the first blockchain, and the second blockchain object on the second blockchain and so on. The events may be external to the first blockchain, the second blockchain or both. Additionally, the event interface 220 may monitor a state of the first blockchain object and/or the second blockchain object. Based on the state of the first blockchain object and/or the second blockchain object, the dynamic gateway may control interactions directed to the first blockchain object, the second blockchain object or both. In some embodiments, the interactions to the first blockchain object, the second blockchain object or both may be by way of messages addressed to the first blockchain object, the second blockchain object or both. The event interface 220 may also provide an interface between a blockchain object and an event that may affect the blockchain object on a cloud function. Also, the event interface 220 may facilitate the ability for the first blockchain object, second blockchain object or both, deployed on the first blockchain and second blockchain, respectively, to request information and events from the event stacker engine 221 through a messaging mechanism.

A blockchain object (batch object) may be an "intelligent program" deployed on a blockchain (or batch). In some embodiments, the "intelligent program" may be automatically configured to seek "consensus" at designated times or instances and may be executed in a secure enclave created for authorized parties to provide consensus.

For example, in an "intelligent program" that governs a solicitation of value, the intelligent program may include machine-readable instructions to access its internal storage, machine-readable instructions to read the storage of a message sent to the intelligent program and machine-readable instructions to process the data in a received message. The message may relate to an allocated amount of value. When the allocator (a user) sends an input to the intelligent program, the intelligent program may update its internal storage to include the event, such as the identity of the allocator, the allocated amount etc. The updated intelligent program may be recorded as an event (e.g., a transaction) on a new block on the blockchain. In other words, the blockchain stores the changes in state of the intelligent program as a series of events (e.g., a transaction). In one example, the blockchain may use a "consensus" algorithm that incentivizes parties involved to execute the intelligent program in a virtual machine and record the changes to the internal storage in the intelligent program, i.e., state of the intelligent program to create new blocks.

The intelligent program may allow the administration and enforcement of some or all of the obligations and liabilities of the participants that may interact with the intelligent program. One intelligent program may use another, for example, a "utility" program, to provide a library of functions to other programs. In one example, a "utility" program may obtain updates on conditions that may affect the obligations and liabilities of the parties to the intelligent program. Also, the intelligent program in the blockchain may include code and data accessible to everyone by retrieving the blockchain.

The consensus may be recorded on the next block in the blockchain, before a release trigger (by the consensus release trigger 234) is executed for release of funds. The secure enclave may be executed by an off-chain machine-readable instruction set, that executes within a secure, trusted container. The context schema may describe the constraints on interactions of a particular blockchain object. The blockchain object may be of two types, one with code capable of being executed on a node of a peer-to-peer network established to validate the blockchain, and one without code. Examples of constraints may include the state, persona, role, action, and parameters of an action associated with the blockchain object and the like. In some embodiments, a blockchain object may be a set of code that regulates an interaction between two or more particular participants for a specified objective, for example, reaching consensus on a particular transaction. A participant may be a participant of the blockchain with a specific objective with respect to a blockchain object on the blockchain. The blockchain object may regulate an interaction with and to the blockchain object based on constraints defined in machine-readable instructions. The blockchain object may save an immutable record of the interaction on a new block on the blockchain, which may be stored in the data center 206 or ultimately in the distributed ledger of transaction records 117 (accessible to authorized parties). In some embodiments, access may be provided for a compliance purpose, for example, for submissions to the SEC.

The blockchain object may contain machine-readable instructions (e.g., code) that govern the interactions of the blockchain object. The blockchain object may save its current state on the blockchain. For example, the blockchain object may store its state in the blockchain object itself, or outside the blockchain object. The interactions of the blockchain object may be restricted by the machine-readable instructions to serve a specific purpose. For example, the blockchain object may interact with its stored state or interact with other blockchain objects. The blockchain object may be deployed on the blockchain. The blockchain object deployed on the blockchain may be assigned.

The event stacker engine 221 queues one or more events as they occur. For example, the event stacker engine 221 may be a function on a cloud platform using some or all of the components described in FIG. 2A to receive data from multiple sources and queue the data for other functions in the dynamic gateway to further process. In one example, the event stacker engine 221 may receive large streams of data and include a scalable data streaming platform and event ingestion functions capable of receiving and processing millions of events per second. Examples of the type of events received at the event stacker engine 221 may include data from real-time input feeds. Other types of events may include user interactions received via user interface 223, events received from other applications systems, events received from blockchains, and events received from an off-chain storage (not in the data center 206 or apportioned within the data center 206 for off-line processing). The event stacker engine 221 is configured to receive feeds from various sources. For example, the event stacker engine 221 may receive and store events in the order in which the events occur, or are received, to allow one or more operations (batch processing) or functions, such as blockchain programs, which are further described below, to process the events. The event stacker engine 221 may receive events through the communication network 128. In some embodiments, pre-designated programs may be used or pre-defined for use to enable the processing of events on the event stacker engine 221 or for processing data generally on the dynamic gateway 200. Or, for processing events received from the blockchain and any source of events internal to the dynamic gateway 200 or external to the dynamic gateway 200. In some embodiments, programs may include machine-readable instructions that may be executed on the blockchain or in secure enclaves outside the blockchain. The programs may execute their machine-readable instruction in a secure enclave where the data is protected during execution of the code. In one example, components such as the authentication engine 222 of the dynamic gateway 200 may be embodied as a secure program. The gateway 200, may use the secure programs to perform secure operations.

In some instances, an input function may process events received from external sources before sending the events to the event stacker engine 221. In other instances, the input function may deploy the received events as messages addressed to a blockchain object on blockchains. In one embodiment, the message may be a message blockchain object addressed to a first blockchain object on a first blockchain. For example, assume the first blockchain object and the second blockchain object includes machine-readable instructions that control value transfer. Also, assume a participant with the persona of an "allocator" interacts with the blockchain object and another participant with the persona of a "financial structure or entity" interacts with the blockchain object. The gateway 200 may receive a message addressed to the second blockchain object (Object II, 227b, in FIG. 2B) on the second blockchain with an offer. The gateway 200 may then synchronize the message to the first blockchain object (Object I, 227a) by deploying a message blockchain object addressed to the first blockchain object 227a on the first blockchain with the offer.

The event stacker engine 221 may also interface with an Application Programming Interface (API) 225 that invokes generating a user interface 223a via a user interface generator 223. The user interface generator 223 may generate the user interface 223a to receive interactions from a participant user. The gateway 200 may treat the interaction received from the participant user as an "event." In one embodiment, the user interface 223a may be generated on a remote computer. The user interface 223a may be displayed on a screen in a web browser. The user interface generator 223 may queue events received from participant users via the user interface 223a in the event stacker engine 221 through the API 225.

Also, in some instance, an input organizer (shown) may receive an event from other systems. For example, an input organizer (not shown) may receive an event from other application systems coupling the financial structures (FIG. 1). The input organizer may also retrieve events from off-chain storage 207 and other functions, as is further discussed below.

In some embodiments, the API 225 may allow the gateway 200 to receive events at the event stacker engine 221 from the user interface 223a. The events may in examples identify a user (e.g., a particular user), provide authorization to interact with a blockchain object, identify a list of currently associated blockchain objects, generate new blockchain objects, provide documents for hashing, uploading to a blockchain, provide documents for storage on the off-chain storage 207, details of a blockchain object such as owner, the users allowed to interact, value amount, etc. Although the user interaction is described with reference to the user interface 223a, the gateway 200 may receive events from a participant user through a command line, a holographic interface, a voice recognition system, from other systems, or the like.

In one example, the input organizer in association with the API 225 may provide an interface to websites, mobile devices, and other systems to allow access to designated blockchains and/or blockchain objects I (227a) and II (227b). The gateway 200 may therefore provide a program that may allow interaction between the blockchain and participants using the API. For example, a mobile application may use the API to allow participants access to blockchains 227a and 227b. In some embodiments, examples of functions that may process the events queued by the event stacker engine 221 may include functions, such as a storage function, a blockchain function, a blockchain monitor, an analytics function, an integration function, etc., which are further discussed below. Also, the gateway 200 may process events, and determine whether to alter the state of blockchain object I and/or II based on the events, as is further discussed below.

The storage function may select to store the events in an off-chain storage. Off-chain storage refers to storage outside the blockchains 227a and 227b. Examples of the off-chain storage may include databases, cloud storage functions, data lakes, and the like. In some embodiments, the gateway 200 may store events locally on a hard drive, and the storage function may process the events before storing the events in the off-chain storage. In one example, the gateway 200 may use a post-processing function to process events before storing the events in the off-chain storage. The storage function may maintain a synchronized version of events on the blockchain 227a and 227b, in the off-chain storage. For example, the storage function may generate a hash 240a of a new event that occurs on the first blockchain or the second blockchain and store the event and the hash 240a in the off-chain storage. Also, the gateway 200 may deploy a message blockchain object to the other blockchain with the new event addressed to the blockchain object on the other blockchain to synchronize the events on the two blockchains. The storage function may generate a hash 240a (the same hash reference numeral represents all types of hash generated) of each blockchain object on blockchains 227a and 227b, when new objects are added to blockchains. The hashing algorithm may hash the blockchain object (i.e., event received from blockchains) from the event stacker engine 221 before storing the hash 240a and the transaction to the off-chain storage. The hashing algorithm may use a SHA (Secure Hashing Algorithm) or any suitable cryptographic function to generate a hash 240a of an input, such as an event. Also, the hashing algorithm may be used to hash an event, such as a blockchain object deployed on blockchains 227a and 227b. For example, when the first blockchain object "Object I" is deployed on the first blockchain 227a, the first blockchain object "Object I" is hashed using the hashing algorithm, to determine a hash component of the blockchain object "Object I." The storage function may store the first blockchain object "Object I" and the hash component 240a in the off-chain storage. Hashes may be used to identify blockchain objects stored in the off-chain storage. Hashes may also be used to verify whether the blockchain objects stored in the off-chain storage are the same as those on the blockchain 227a and/or 227b. For example, the gateway 200 may compare the hashes of the same blockchain object stored on the first blockchain 227a and the off-chain storage to verify that the two objects are identical and has not been tampered with. In one embodiment, the gateway 200 may store the hash component of the first blockchain object 227a to the blockchain 227b instead of deploying the first blockchain object 227a. The storage function stores the hash component and the first blockchain object "Object I") in the off-chain storage. Storing the hash 240a of the first blockchain object "Object I" instead of the first blockchain object "Object I" itself on the first blockchain 227a may allow the gateway 200 to execute the first blockchain object "Object I" in a secure enclave in response to events on the first blockchain 227a and/or on the second blockchain 227b and deploy the new hash (e.g., the first blockchain object "Object I" may have a changed state after execution) of the first blockchain object "Object I" after execution on the first blockchain 227a. Although described with reference to the first blockchain object "Object I" and the first blockchain 227a, the storage function may perform similar operations on the second blockchain object "Object II" deployed on the second blockchain 227b.

In some embodiments, the storage function may store information on the off-chain storage 207 that may not be placed on blockchains 227a and/or 227b due to the immutability of blockchains. For example, the personally identifiable information may be stored in the off-chain storage.

The event stacker engine 221 may also receive an event (e.g., a blockchain object on a blockchain) from the authentication engine 222. For example, the authentication engine 222 may serve as a blockchain monitor 240 (or batch-records monitor) to monitor batch or block updates, i.e., blocks as they are added to blockchain records. A batch or block update may be a new block. The blocks may include files containing blockchain objects.

A blockchain monitor may retrieve a new block after it is posted to the first blockchain, identify a plurality of events in a block update (i.e., a new block) in the first blockchain, and queue the plurality of events on the event stacker engine 221 for processing. In one example, the blockchain monitor 240 may monitor the first blockchain 227a generated on a network of nodes validating the first blockchain 227a to generate a consensus on the new block with blockchain objects external to the gateway 200. The blockchain monitor 240 may receive a new block on the first blockchain 227 in an instance that a user profile is created and an allocation is received in a node within the private network or at a location external to the gateway 200. The new block is released after the node generates the new block based on a consensus protocol of the first blockchain 227a. Examples of consensus protocols for the first blockchain 227a may include validation by a set of preauthorized parties. The blockchain monitor 240 may identify blockchain objects on the new block. In one example, the blockchain monitor 240 may generate an event for each blockchain object on the new block. Events may be queued on the event stacker engine 221 from the blockchain monitor 240. The events may also be stored in the off-chain storage 207 by the storage function as described above.

In some examples, the blockchain monitor 240 may receive a block update with a change in state for the first blockchain object 227*a*. The blockchain monitor 240 may place the event with the change in state of the first blockchain object 227*a* on the event stacker engine 221. In another example, the blockchain object "Object I" may depend on the gateway 200 to change its state (e.g., the blockchain object "Object I" may not be executed/supported on the blockchain 227*a*). The blockchain monitor 240 may receive a block update with a message blockchain object addressed to the first blockchain object Object I.

The blockchain monitor 240 may place the message event on the event stacker engine 221 for other functions in the gateway 200. Although described with reference to the first blockchain object Object I and/or the first blockchain 227*a*, the blockchain monitor 240 may provide similar functionality to other blockchain objects and/or blockchains. The event stacker engine 221 may also interface with a blockchain function that writes events to the first blockchain 227*a*. The blockchain function may allow the gateway 200 to deploy selected events from the event stacker engine 221 to the first blockchain 227*a*. For example, the gateway 200 may receive an event (e.g., an interaction from a participant) through the user interface to deploy the first blockchain object Object I. The blockchain function may then transmit the first blockchain object to a node on a private or public network of nodes validating the first blockchain 227*a*. The node may then generate a new block for the first blockchain 227*a* based on the consensus protocol of the first blockchain 227*a* controlled by the authentication engine 222. As described above, the storage function may also store the first blockchain object, Object I, designated by reference numeral 227*a*, in the off-chain storage 207. The storage function may also store the hash of the first blockchain object Object I (227*a*) in the off-chain storage 207.

In one example, the blockchain function may deploy the first blockchain object Object I (227*a*) to the first blockchain 227*a*. Although described with reference to the first blockchain object Object I (227*a*) and/or the first blockchain 227*a*, the blockchain function may provide similar functionality to other blockchain objects and/or blockchains. For example, the blockchain function may deploy the second blockchain object to the second blockchain 227*b*.

In another example, the blockchain function may be blockchain agnostic. For example, the blockchain function may deploy blockchain objects Object I (227*a*) and/or Object II, 227*b* to two or more blockchains 227*a* and/or 227*b*.

The storage of events on off-chain storage 207 allows analytics functions and reporting and integration functions to use the data without additional steps to obtain blockchain object data from the first blockchain 227*a*, the second blockchain 227*b* and/or both. Examples of the analytics functions may include Azure™ Data Lake analytics, Azure™ Stream Analytics, machine learning analytics and the like. Also, the off-chain storage 207 augments the first blockchain object 227*a* with contextual information about the first blockchain object "Object I" 227*a* not available on the first blockchain 227*a*. The contextual detail is available to functions on the gateway 200 including functions that are blockchain agnostic using the configuration file, which describes relationships between users, their roles, actions available to them, parameters of the blockchain object and the like. The reporting/integration function may allow integration of the blockchain objects stored in the off-chain storage 207, the contextual details augmented by the configuration file and a data repository storing the values of the contextual information in accordance with the type information in the configuration file with functions that are not blockchain aware. The functions that are not blockchain aware may access the events from the first blockchain 227*a*, the second blockchain 227*b* or both from the data repository storing all the values along with contextual information.

The computing device has an authentication engine 222, to ensure valid entry by participants. In this embodiment, assume the computing system 106/116 creates an object through the system, which may store contextual data (e.g., user's profile) for the system, which may be created when the user initially registers with the system via front-end registration 208, or is otherwise created when information for the contextual data (e.g., user's profile) is collected by the computing device. To create the object, the user may log into the system with a username and password. From the login information, the authentication engine, which may use an identity function may query the off-chain storage to determine contextual data of the user, such as the user's persona etc. In one example, the identity function may obtain the contextual data of the user (e.g., user's profile) from a data repository. A configuration file may also associate the real-world identity of the user with a system identity of the user. The identity may be based on a public key previously used in a blockchain or a private key cryptography. The configuration file may describe the persona of the user as one allowed to interact with the system only to create a profile, indicate preferences, and allocate funds. These actions may be defined in the form of an action. The data repository may store specific details such as identities of the persona in the system, their first name and last name and the like based on the schema described in the configuration file. This identity of the user may be used to sign the first object created.

Figure 9:
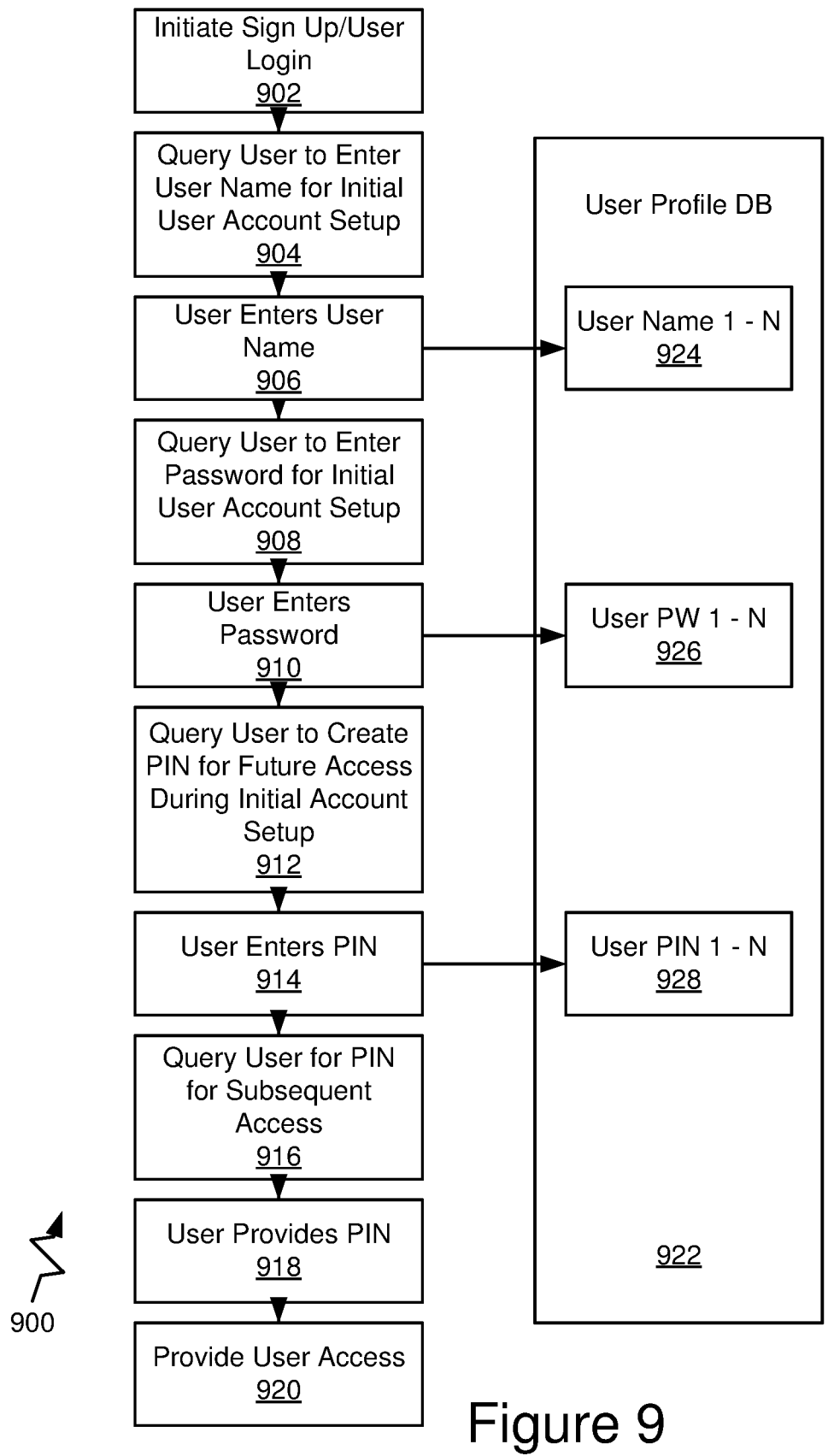
FIG. 9 is a flow chart illustrating the operations of the dialog processor and manager at the front end of the client-server architecture.

The system may present the user with a GUI in the user interface to create the object based on the contextual data of the user as is further described in FIG. 9. The GUI may allow the user to generate the object to set up a profile using the context schema. In one example, the system generates the configuration file, as an instance of the context schema, during generation of the profile object. The system may determine the persona, role, actions, parameters and the like based on the contextual data.

The computing device further comprises a user wallet creation engine 224, which includes a funds processor. This is software and instructions for creating a user wallet once a user profile is created, in which a user can allocate an amount of value, either in fiat currency or cryptocurrency. The computing device further comprises a user preference tracking engine 226, which segregates user fractional allocations by the preference indicated. The computing device further comprises a preference-batch compiler, which is operable to separate funds designated for preferences into preference vaults. For example, if there are four preferences offered to users, allocations for each preference type are compiled in the appropriate vault. The computing device further comprises a batch formation engine 230, which creates a first batch until funds aggregate up to a threshold limit, then a second batch, and so on. Each batch formed has a unique identifier. The batch value aggregator 232 aggregates the amounts to meet the threshold limit. It records the list of users whose contributions are included in the specific batch. Each of the objects created are recorded in the storage device or data center 206. The record with the amounts that meet the threshold limit require a consensus from a group of designated validators, who review and approve the record. When consensus is reached, the consensus and release trigger designate the batch for release and an alert to a banking institution that the funds should be released.

Referring now to FIG. 2B, the gateway 200 (FIG. 2A) may create, deploy and manage a first blockchain object Object I, 227*a* on a first blockchain 227*a* and a second blockchain object Object II, 227*b* on a second blockchain that are linked using a linking identification 229, in some embodiments. The term blockchains 227*a* and/or 227*b*, may refer to either of the blockchains or both. In some examples, the blockchain objects shown here may be smart programs. As is further discussed below, the gateway 200 may also serve as an interface between an event, which may be received and queued for processing in an event stacker engine 221, and the first blockchain object "Object I," 227*a*, the second blockchain object "Object II," 227*b*, or both. The gateway 200 may also facilitate and control interactions with the first blockchain object, the second blockchain object, or both, by a user or another system attempting to interact with the blockchain object. For example, the blockchain object Object I, 227*a* may be accessible only to a participant with a persona of an "allocator," while the blockchain object Object II, 227*b* may be accessible to a participant with a persona of "allocation manager." The gateway 200 may use the linking identification 229 to synchronize the blockchain object Object I, 227*a* on the first blockchain 227*a* and the blockchain object Object II, 227*b* on the second blockchain. Also, the gateway 200 allows functions, which may be incorporated in the gateway 200, to process events and other information pertaining to the blockchain objects Object I, 227*a* and Object II, 227*b*. A "function" may refer to a software functionality or a set of software functionalities that different systems or users or other software functionalities can reuse and may include policies that control its usage. It should be understood that the gateway 200 may include additional components other than shown and that one or more of the components described herein may be removed and/or modified without departing from a scope of the gateway 200.

As discussed above, the gateway 200 may use a blockchain function in the consensus release trigger 234 to sign the first blockchain object Object I, 227*a* before deploying to the first blockchain 227*a*. The gateway 200 may use an identity function (identity-validation engine 242) to determine the signing key for a user and the signing function 244 to cryptographically sign the first blockchain object Object I, 227*a* with the determined signing key before deploying the first blockchain object Object I, 227*a* to the blockchain 227*a*. The cryptographic signature of the first blockchain object Object I, 227*a* may be the signature of the first blockchain object 227*a* generated using the private key of a participant. Each object on the first blockchain may be cryptographically signed using the private key of one or more participants that create or interact with the first blockchain object. In one example, a participant may generate an event (e.g., a message addressed to the first blockchain object "Object I") and deploy the event to the first blockchain 227*a* to interact with the first blockchain object "Object I." The first blockchain object "Object I" may receive the event and execute the blockchain object's machine-readable instructions (e.g., code) on a peer of a peer-to-peer network validating the first blockchain 227*a*. The first blockchain object Object I, 227*a* may then change its state based on the interaction. In one example, the first blockchain object "Object I," 227*a* may store its current state as a final step of each execution. The peer on the peer-to-peer network may release the first blockchain object with the new state on a new block of the first blockchain 227*a*. If needed, the cryptographic signature of the participant who deployed the first blockchain object Object I, 227*a* may be retrieved from a previous block of the first blockchain 227*a*. The cryptographic signature of the message may be detected from the message by examining the signature on the message and identifying the public key using the asymmetric property of cryptographic signatures. In one example, the gateway 200 may access a public database holding the public keys, associated names and email address of the participant to retrieve the off-chain identity based on the blockchain identity.

The gateway 200 may trigger a change to the first blockchain object Object I, 227*a* by sending a message addressed to the first blockchain 227*a* through the blockchain monitor 240. The message may be a message blockchain object deployed to the first blockchain 227*a*. The signing function 244 may sign the message using cryptographic keys of a participant (e.g., a buyer of an asset or a seller of an asset in a blockchain for selling an asset). For example, the gateway 200 may detect a change in state of the second blockchain object Object II on the second blockchain 227*b* that is correlated with the first blockchain object Object I, 227*a* through the linking id 229. The gateway 200 may then trigger a change to the first blockchain 227*a*.

For example, the gateway 200 stores, in its main memory 204, a private key 246 and a public key 248 of a particular participant interacting with the gateway 200. In one example, the message blockchain object may be signed using the private key 246 of the participant. Thus, the gateway 200 can authenticate message blockchain object using the cryptographic function. Memory 204 is shown by way of example as a storage device that may store information for the gateway 200, including cryptographic keys and other information, but other types of storage may be used as well.

The input function may process an event and place the event on the event stacker engine 221 for deployment to the first blockchain 227*a* through the blockchain monitor 240. In one example, the gateway 200 may use the hashing function 240, the signing function 244, or both, to securely encrypt the confirmation message with the public key 246 of the participant to confirm receipt of consideration.

The gateway 200 may use the signing function 244 to sign the first blockchain object Object I, 227*a*, for example, using the private key 246 and the public key 248 from the memory 204. The gateway 200 may also generate a hash of the first blockchain object Object I, 227*a* and store the hash on the off-chain storage 207. The gateway 200 may then deploy the blockchain object through the blockchain monitor 240.

In one example, for asset transfer, a seller, a buyer, a banker, an inspector and an appraiser may be entities that are part of a consortium. The entities may have employees who perform various roles in the asset transfer. For example, the bank/payment processor, the inspector at the system and an outside validator may be part of a private consortium blockchain. The gateway 200 may use a hashing function 240 to generate a hash of the blockchain object (e.g., a transaction) posted on the private consortium blockchain. The gateway 200 may then deploy the hash of the first blockchain object "Object I," 227*a* to the second blockchain 227*b*. The hash of the first blockchain object "Object I," 227*a* deployed on the second blockchain 227*b* may allow the users to determine whether the state of the blockchain object "Object I" has changed on the blockchain without accessing the blockchain 227*a*. For example, assume the first blockchain object "Object I," 227*a* and the correlated object "Object II," 227*b* are deployed on the first blockchain 227a and the second blockchain 227b, respectively. The gateway 200 may deploy the hash of the first blockchain object "Object I," 227a on the second blockchain 227b. The blockchain monitor 240 may then monitor the updates to the state of the first blockchain object "Object I," 227a on the first blockchain 227a. When the state of the first blockchain object "Object I," 227a changes, the blockchain monitor 240 may post the new hash of the blockchain object "Object I," 227a addressed to the second blockchain object "Object IL," 227b on the second blockchain 227b.

Thus, the gateway 200 may allow blind transactions on private, semi-private blockchains. Also, the gateway 200 may act as an interface between blockchain objects on two different blockchains.

The identity-validation engine 242 may reduce the complexity of interacting with the first blockchain 227a for a participant using the gateway 200 by associating an off-chain identify of the participant with a blockchain identity of the participant. In one example, the off-chain identity of the participant may be the first name and last name of the participant, the job title, the role, the organization unit, email address, phone number and the like of the participant in an organization. In another example, the participant may be a private individual identified by his role, email address, phone number and the like. The blockchain identity of the participant may be the private key 246 and the public key 248 of the participant. The identity-validation engine 242 may store the off-chain identity and the off-chain identity of the participant in the off-chain storage 207. In one example, the identity-validation engine 242 may generate metadata information in the off-chain storage 207 that maps the off-chain identity of the participant with the on-chain identity of the participant for the blockchain objects. For example, a configuration file may include definitions of the different roles within a specific context in the blockchain object. The identity-validation engine 242 may use the role information in the configuration file for blockchain objects and the context such as when the role is enabled for blockchain objects to map the public identity and the private identity of the participant in the off-chain storage 207. In some examples, the identity-validation engine 242 may store the mapping in a data repository in the off-chain storage 207.

For example, assume a user starts a profile to allocate value for a purpose and a second participant from a company offers a purpose. The company offering the purpose and the user may be part of a consortium that uses the gateway 200 and the first blockchain 227a. The first participant and the second participant may be invited to join the consortium using their existing credentials. For example, the existing credentials may be a user name and password and whatever else a user uses to create a profile. In this scenario, the gateway 200 may allow the first participant and the second participant to login using the credentials such as username and password. The gateway 200 may enforce authentication policies of the system on the first participant. Also, the gateway 200 may enforce the authentication policies of company on the first participants (the users). For example, an authentication policy of the company may require a participant to use a two-factor authentication.

In one example, the user participant may log into the gateway 200 with a username, which may be the user participant's name or email address. In one example, the gateway 200 may use a protocol such as the OAuth to authenticate the participant and receive a token that may be used to authenticate the participant a session. For example, the protocol may authenticate the participant using the Azure Active Directory service associated with the company of the participant. For example, for the first participant, the gateway 200 may use the Azure Active Directory service of the first participant to authenticate the participant and to determine a token to authenticate the participant during the session.

In one example, during the first interaction with the gateway 200, the gateway 200 may generate a blockchain identity of the participant such as the private key 246 and the public key 248. In one example, the blockchain identity of the participant may be an address on the first blockchain 227a (e.g., private blockchain). The system on a private network would link the address to a known identity for a user. The gateway 200 may allow the participant to interact with the first blockchain 227a using the token. The token may allow the gateway 200 to map the participant's off-chain identity to the blockchain identity of the participant using the metadata stored in the data repository.

Also, the gateway 200 may assign roles to the participant to allow access to the first blockchain object 227a. In one example, the identity-validation engine 242 may query the data repository to determine contextual details of the user participant, such as the participant's first name and last name, role in the transaction or "persona" (allocator, router, or financial structure) in the blockchain objects associated with the participant, and events associated with the participant. In one example, the gateway 200 may store the information in the data repository using the configuration file. The metadata in the data repository may automatically allow the gateway 200 to identify the appropriate fields to populate, to index the contextual information for easy retrieval, and to provide a data repository that may be used by other functions to seamlessly access the information on the first blockchain 227a and associated objects. The contextual information in the data repository may include information about the participant that may identify the participant to the gateway 200 and other participants interacting with the participant. For example, the contextual information about the participants may allow the gateway 200 to display the first and last name of one or more participants that interacted with the first blockchain object "Object I," 227a, when details of the first blockchain object 227a is presented on the user interface. For example, the participant (e.g., financial structure) will be shown the first and last name, and an option to contact the user, central router, or validator (e.g., an auditor) based on the contextual information.

In one example, the gateway 200 may allow the use of the off-chain identity to compartmentalize access to the information. For example, the gateway 200 may allow the participant to access the blockchain objects based on the role of the participant stored in the metadata on the data repository. In another example, the gateway 200 may restrict access to the participant based on the state of the blockchain object "Object I," 227a and/or "Object II," 227b. For example, assume the financial structure may access blockchain object "Object I" and/or "Object II" only after acceptance. The gateway 200 may enforce these access controls based on the metadata in the data repository mapping the participant's roles to the participant's blockchain identity. The intelligent program may have restrictions on who may interact with the object based on the status of the intelligent program. For example, the first blockchain object "Object I" may allow interaction with only auditors in one of the states. The gateway 200 may use the mapping in the data repository to identify the participant, obtain contextual information about the role of the participant and allow the participant to interact only when the role of the participant matches the restrictions imposed by the blockchain object on the role of the participant. For example, in an intelligent program, code generation could deliver Modifier functions that implement role-based access control to certain functions within the intelligent program.

In one example, the gateway 200 may receive contextual details of the participant through the user interface. Also, the identity-validation engine 242 may also link the off-chain identity and the blockchain identity of the participant by storing these details in the data repository. For example, the identity-validation engine 242 may map the participant's off-chain identity with the blockchain identity on the data repository. In one example, identity-validation engine 242 may store the metadata such as the mapping of the off-chain identity and the on-chain identity to the participant's blockchain identity such as the participant's private key 246 and public key 248. In one example, the participant's off-chain identity may be a user-specific ID that is associated with one or more external identities. For example, an identity that maps to the Azure Active Directory, a mac address for a device, an active directory function on a machine or the like. Based on the stored metadata, the gateway 200 can determine when the off-chain identity and the blockchain identity of the participant match by retrieving the mapping information from the metadata store and verifying the information in order to facilitate interactions with a deployed blockchain object. Also, the identity-validation engine 242 may use the metadata in the data repository linking the real-world identity and the blockchain identity (e.g., in the data repository with the two fields) to remove the participant from the gateway 200 and revoke access to the first blockchain 227a. For example, the gateway 200 may remove a participant who is no longer authorized to interact with the first blockchain 227a on behalf of the company in a consortium.

The signing function 244 may use the private key 246 of the participant to sign the first blockchain object "Object I," 227a, and the blockchain monitor 240 deploys the signed first blockchain object "Object I" on the first blockchain 227a. The identity-validation engine 242 or another component of the gateway 200 may determine whether the participant with a particular off-chain identity is authorized to deploy the blockchain object. For example, the gateway 200 may use context schema to determine persona of the participant, and the gateway 200 may determine whether the participant is allowed to deploy a blockchain object based on the persona and/or role of the participant.

In one example, the gateway 200 may use the identity-validation engine 242 to authenticate the identity of a participant on the first blockchain 227a. For example, after the first blockchain object "Object I," 227a is deployed on the first blockchain 227a, the gateway 200 may receive an event from the first blockchain object "Object I" that requests verification of the identity of a participant. The gateway 200 may receive the event from the first blockchain object "Object I" through the blockchain monitor 240. The event includes the cryptographic signature of a participant associated with the event, which may be provided in a message blockchain object addressed to the first blockchain object "Object I" and/or the object from the participant. The gateway 200 may use the cryptographic signature of the participant from the event to identify the off-chain identity of the participant. For example, the gateway 200 may use a username and password for the participant to authenticate the participant and associate the participant's blockchain identity with the participant's off-chain identity. The gateway 200 may support other authentication schemes over the network such as OAuth protocol and the like.

Although described with reference to the first blockchain object "Object I," 227a and/or the first blockchain 227a, the identity-validation engine 242 may provide similar functionality to other blockchain objects and/or blockchains.

The main memory 204 may store the private key 246, the public key 248, the context schema 250, and blockchain object template 252. In one example, the context schema 250 may include a parameter specification of the blockchain object "Object I," 227a. The parameter specification may include parameters or variables that describe who may interact with the blockchain object, when they may interact, how they may interact, what are the parameters of the interaction, the purpose of the interaction and the like. The parameters may include acceptable types for the information. The context schema 250 may describe a hierarchy of a blockchain object, state, action, persona, role, and other contextual details. The gateway 200 may create an instance of the context schema 250, i.e., configuration file 254. For example, the configuration file 254 as shown inherits the hierarchy of the state list containing the actions from the action list in each state of the state list and the actions from the action list including the personas who may perform the action and the parameters of the actions. For example, the gateway 200 can populate the data repository with values of the parameters, states, actions, personas, etc., described in the configuration file 254. In one example, the gateway 200 may generate a customized instance of the context schema 250 and store this instance as the configuration file 254 that may include customizations such as the parameters specifications, action specifications, state lists, action lists, personas who may interact and the like for a blockchain object. In some examples, the gateway 200 may store the configuration file 254 for the blockchain object, the blockchain object and a hash of blockchain objects in the off-chain storage 207. The difference between the context schema 250 and the configuration file 254 may be the customized parameters and the types specific to a particular blockchain object. The gateway 200 may store the values of parameters in the configuration file 254 in the off-chain storage 207 (e.g., in the data repository).

The configuration file 254 may be used to create the blockchain object. Values of one or more of the parameters in the configuration file 254 may be received via the user interface to create the first blockchain object "Object I," 227a. The values received may be stored in the data repository using the contextual information such as type information in the configuration file 254. In one example, the user interface may also be used to receive values and/or constraints for interacting with the first blockchain object "Object I," 227a, and the constraints may be stored in the configuration file 254, and the values may be stored in the data repository.

In some examples, the gateway 200 may use the configuration file 254 to determine the blockchain identification of the blockchain. The blockchain identification may identify the blockchain (1st blockchain) as the first blockchain object is deployed on the first blockchain 227a, the second blockchain 227b or both. The gateway 200 may then use the configuration file 254 to generate the first blockchain object "Object I," 227a based on the specifications of the blockchain object for the blockchain identified by the blockchain identification. For example, the first blockchain object "Object I," 227a may be deployed on a private blockchain. The gateway 200 may then generate the first blockchain object that complies with the specification for blockchain objects for the private blockchain.

In another example, the gateway 200 may deploy a linked or correlated set of blockchain objects on two or more blockchains. In order to deploy the linked or correlated set of blockchain objects on two or more blockchains, the gateway 200 may determine the specifications for blockchain objects on the different blockchains. For example, assume the first blockchain object "Object I," 227a is deployed on the first blockchain and the linked or correlated second blockchain object is deployed on the second blockchain. The gateway 200 may use the configuration file 252 to determine the blockchain identification of the first blockchain and the second blockchain. In one example, different participants may use different blockchains. The gateway 200 may then generate a blockchain object based on the specification for the blockchain. Similarly, the gateway 200 may then generate a blockchain object based on the specification for the blockchain.

The blockchain objects may include functionally similar machine-readable instructions that are compatible with their respective blockchains. Also, the gateway 200 may generate a linked identification to link the first blockchain object and the second blockchain object in the data repository. For example, assume the first blockchain is a private blockchain with a particular programming language and the second blockchain is another private blockchain with another programming language, and the programming language is Java™. The gateway 200 may determine the specifications for blockchain objects on the first blockchain and second blockchain. Then, the gateway 200 may generate the first blockchain object with the logic governing the interactions between one or more participants in the first programming language and generate the second blockchain object with the logic governing interactions between one or more participants in Java™. Thus, gateway 200 may then generate a linked identification. The gateway 200 may deploy the linked set of blockchain object (e.g., intelligent program) on two or more blockchains.

The gateway 200 may use the contextual details of the participant, to generate the appropriate user interface for the participant. For example, to create the blockchain object for deployment, the gateway 200 may use the configuration file 254 to determine the parameters of the initial state of the first blockchain object, and the actions available in the initial state, and the parameters associated with the actions in the initial state for the first blockchain object. For example, the initial state of the first blockchain object 227a may be part of the state list, the actions available to the participant may be available in the action list and the parameters for the action may also be available in the configuration file 254. Also, the off-chain storage 207 may include the data repository with contextual information about the participant. The gateway 200 may thus display the user interface with all contextual information of the blockchain object in the initial state that may facilitate the participant's decision making. The information displayed may be based on the contextual information about the initial state such as the information already available about the blockchain object, default information for some types of parameters of the blockchain object. The user interface may also generate user interface elements such as buttons and entry fields based on the type of the parameter requested. For example, a yes or no decision or a decision with a fixed set of choices may be presented as a button or a drop-down list with the appropriate label from the configuration file 254. A request for a numeric quantity (e.g., a type integer) or name or description (e.g., a type string) may be presented using an input text box.

Although described with reference to the first blockchain object and/or the first blockchain, the configuration file 254 may provide similar functionality to other blockchain objects and/or blockchains.

Blockchain object templates, such as blockchain object template 252 in association with the context schema 250 or the configuration file 254, may be used to create blockchain objects. The blockchain object template 252 may include the machine-readable instructions for the blockchain object (e.g., code for blockchain objects). For example, the blockchain object template 252 may be associated with the configuration file 254. The configuration file 254 may describe the states of the blockchain object, the actions of the participants in each state, the persona of the participant who may interact with the blockchain object in each state and the role of the participant and the like. For example, the state list may provide a series of states or a state map and the next states from a particular state. The actions of the participant who initiates the blockchain object in the initial state may be retrieved from the actions list. The parameters of the action and the types of these parameters may also be obtained from the configuration file 254. This information may be described as the contextual information of the blockchain object. Also, the gateway 200 may include contextual information about the participant in the data repository.

The user interface generator 223 (FIG. 2A) may generate the user interface using the contextual information from the configuration file. The user interface generator 223 may display the user interface, and a participant may enter values for parameters as specified in the configuration file 254 associated with the blockchain object template 252 via the user interface. The gateway 200 may create the first blockchain object "Object I," 227a using the machine-readable instructions in the blockchain object template 252.

The event stacker engine 221 (FIG. 2A) may receive the values and initialize the first blockchain object "Object I," 227a with the values. The gateway 200 may store different blockchain object templates for different types of workflows, which may include code for different types of blockchain objects. In one embodiment, the gateway 200 may select a template that corresponds to the type of blockchain object being created based on the role of persona of the participant. Also, a selected blockchain object template may be instantiated with information from the off-chain storage 207 (e.g., the data repository). For example, the gateway 200 may determine based on the off-chain identity of the participant, the role of the participant logged into the gateway 200 and constraints on the interactions with the blockchain based on the role of the participant. The gateway 200 may then select the appropriate blockchain object template for the template and may place constraints on values that can be instantiated for parameters in the selected template based on the constraints for the participant. The parameters in the selected template may be provided from the context schema 250 or configuration file 254.

In one example, the event stacker engine 221 may receive values for parameters in the configuration file 254 from various sources. For example, the off-chain storage 207 may include many of the values that are predetermined for the participant logged into the gateway 200. As another example, the blockchain identity of the participant and the associated off-chain identify may be stored in the memory 204 or a specific data repository. The blockchain identity may include a cryptographic key, roles of the participant, and constraints on interactions with the blockchain objects that may be used for creating and deploying and managing interactions with the blockchain object Object I, 227a.

The gateway 200 may use the consensus release trigger 234 to deploy the blockchain objects to blockchain one (227A) and/or blockchain two (227B). The gateway 200 may use the identity-validation engine 242 and the signing function 244 to cryptographically sign the blockchain object "Object I," 227a and/or "Object II," 227b using the public 248/private keys 246 of the participant before deploying the first blockchain object "Object I," 227a to the first blockchain one 227A.

The gateway 200 may also use the private key 246 and the public key 248 of the participant to authenticate events to and from the blockchains one and/or two. Once deployed, the gateway 200 may receive an address from the blockchains one and/or two. The address uniquely identifies the first blockchain object "Object I," 227a on the first blockchain one (227A). The gateway 200 may store the address in the data repository. The gateway 200 may also store information such as the location of the first blockchain object "Object I," 227a. For example, the identity of the first blockchain one (227A) where the first blockchain object ("Object I," 227a) is deployed. In one example, the gateway 200 may deploy dependencies for the first blockchain object "Object I," 227a before deploying the first blockchain object. For example, the gateway 200 may deploy a program to retrieve real-time data from one or more external sources on a periodic basis before deploying the first blockchain object. Also, the gateway 200 may use the storage function to store the first blockchain object along with the configuration file 254 in the off-chain storage 207. The off-chain storage 207 may store hashes, such as the hash created to verify the data stored on the off-chain storage 207, to make sure that it matches the first blockchain object "Object I," 227a deployed to the first blockchain one (227A), The gateway 200 may use a blockchain ID (identifier) of the first blockchain one (227A) to choose the blockchain for deploying the first blockchain object, "Object I," 227a. For example, the gateway 200 may use a unique ID for each blockchain. Although described with reference to the first blockchain object 227a and/or the first blockchain 227A, the gateway 200 may continuously provide similar functionality to other blockchain objects (e.g., "Object N," "Object N-2" and so on) and/or blockchains ("Blockchain NN").

In one embodiment, the deployed first blockchain object may be executed simultaneously on virtual environments on distributed peers depending on the type of blockchain. Also, the gateway 200 may deploy the first blockchain object on a blockchain without support for the first blockchain object. For example, the first blockchain object may be deployed as a program to run in secure enclaves on secure computers that may be off-chain. The programs running in secure enclaves may be hashed, and the hash deployed on the blockchain without support for the first blockchain object executing on a peer of the peer-to-peer network validating the first blockchain. Thus, the gateway 200 may support the use of blockchain objects with machine-readable instructions on different blockchains with and without support for blockchain objects with machine-readable instructions that may be executed on a peer of the network of peers mining the blockchain.

Figure 3:
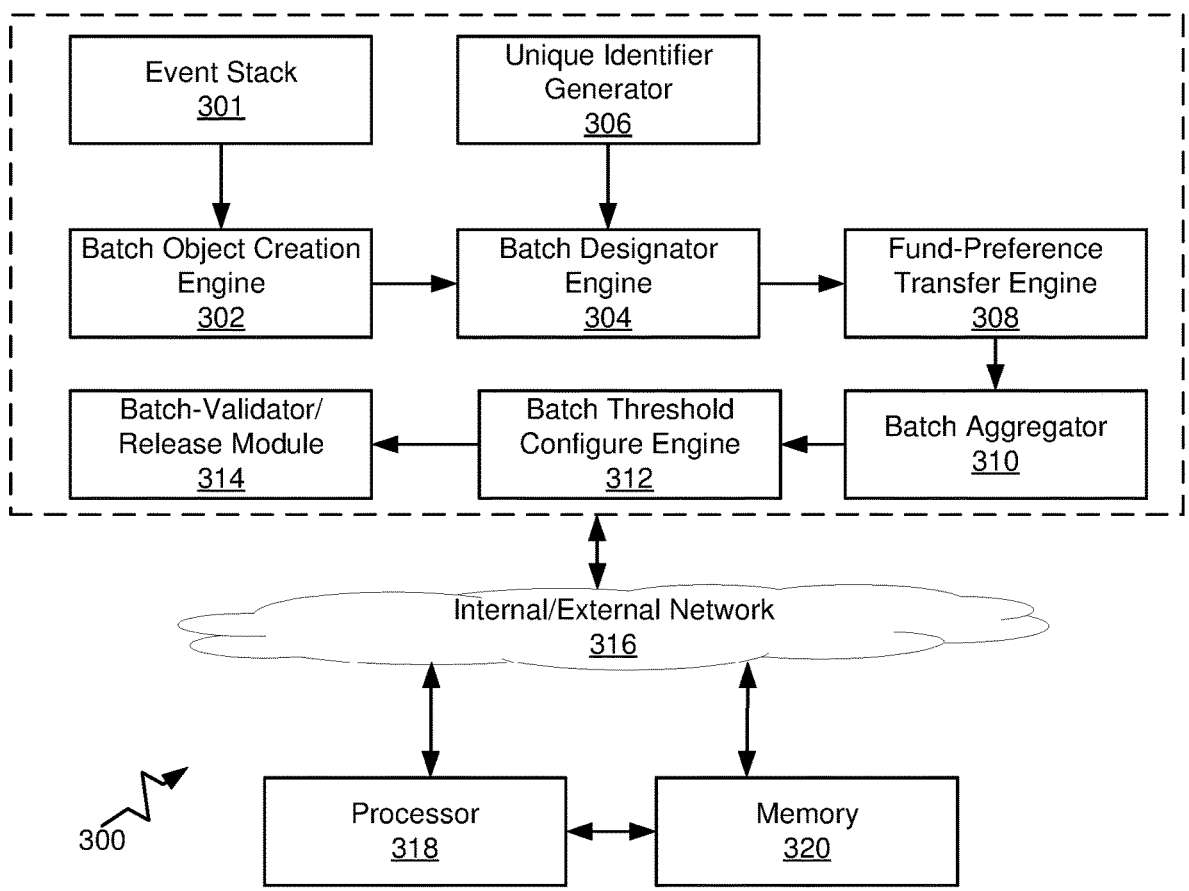
FIG. 3 is a block diagram illustrating the batch creation process and its various operations.

Referring now to FIG. 3, once user profiles are created for different users and their preferences are recorded, the dynamic gateway 200 moves to the next phase of operations illustrated generally by reference numeral 300. In some embodiments, a batch object creation engine 302 creates an object in the instance a first user profile is created and waits to open a next batch when a particular batch (with aggregated value) reaches it threshold limit. The batch object creation engine 302 is configured to create objects continuously and as required. Once a batch or associated block is created, a batch designator engine 304 designates a unique identifier to the batch, as generated by the unique identifier generator 306. The unique-identifier may be a unique address. The unique address may be used to identify the batch object and to interact with the batch object. For example, a sequence of batches may receive events associated with each batch object created from an event stack 301 of the gateway in the form of messages addressed to the object's unique address. In one example, the gateway may deploy a message with an event associated with a first object. The gateway system may deploy the message as a message object addressed to the first object at the first object's unique address in a new block. In some embodiments, the second object may be a data object. An authorized entity in a peer-to-peer network that is established to validate the object to ensure a consensus may receive the message object and include the message object in a new block. In one example, the authorized entity may execute machine-readable instructions on the first object in response to the message object addressed to the first object while evolving a consensus for the new block. The first object may store its change after execution, i.e., change its state or remain in the same state. The node may store the first object (which may have a changed state) along with the message object in a new block before validating the new block to arrive at a consensus. In another example, to prevent the object from being executed on all peers validating the objects created, the object may be a set of code executed on the system in a secure enclave. The system may retrieve both the first object and the message object and execute the machine-readable instructions in a secure enclave and deploy the resulting object back for recording.

The object may include machine-readable instructions that perform actions that are constrained. The machine-readable instructions may record the current state of the object, the person who deployed the object, the persons who may interact with the object and the like. In one example, the system may use the object's machine-readable instructions and/or the current state stored in storage to derive the context of the object.

The event stack 301 of the gateway system provides an interface between events and the object. For example, the event stack 301 may deliver an event to the object using one or more functions. Events may include external events to the system and internal events generated in the system. For example, an internal function may generate periodic events. One example of an external event may be a message from a payment processor that a payment is received by the system. The event stack may queue events for processing by one or more system functions. Examples of external events may include notifications authenticating a user. The event stack may receive events, such as notifications every time a user logs in and allocates additional value to an associated account, which would trigger a change in the state of the object. Examples of internal events may include an event generated by an internal function in the gateway system. For example, a set of code may be configured in the gateway system to generate an internal event periodically. In one example, the event may alter the state of the object. Also, the gateway system may provide an interface for monitoring and managing the state of an object by monitoring the updates. The event stack 301 may allow the gateway system 200 to process events in real-time. The event stack 301 may queue events as the events arrive. The gateway system may treat inputs received from outside the gateway system as events and use the event stack 301 to allow one or more functions to process the events. In one example, the gateway system may also treat inputs and outputs of functions as events that may be processed by other functions. The gateway system may include one or more functions that retrieve and process the events. Thus, the gateway system (e.g., functions of the gateway system) may access the queued events to retrieve and process the events. For example, the gateway system may allow integration of an enterprise banking system that can perform operations such as money transfers and credit card processing with an object without any changes to the enterprise banking system.

The gateway system may utilize a context schema to provide context to the logic (e.g., machine-readable instructions) expressed in the object (e.g., a program) for example to generate an application programming interface ("API"). The application programming interface may be used to allow interaction with the object through a webpage, a mobile page, or a bot, or the like. In some examples, the gateway system may generate a user interface that allows a participant to interact with an object based on a context schema. The context schema may describe the specifications of the object and constraints for interacting with the object. For example, a context schema may describe the current status of the object, the possible state transitions from the current state, the personas who may interact with the object, and the like. In some examples, an instance of the context schema may be saved as a configuration file. Also, the configuration file may include details of the identification of an enterprise private channel, a location or the like that the object is deployed on. The identification may be different for different for different enterprise locations. The configuration file may be specific to an object. The configuration file may be stored in the system and/or on the object.

The user interface 223a (FIG. 2A) generated by the gateway system allows a participant, such as a user or a system, to interact with the object (with quick-clicks). For example, the system may generate different graphical user interfaces ("GUIs") based on the current state of the object, the previous states of the object, future states, possible actions in the current state, possible actions based on the persona of the participant in the interaction, parameters of actions, and the like. With each interaction, the user interface generator 223 may store data entered by users and generate a next user interface (for a subsequent entry) by anticipating the entry purpose and providing quick clicks options to the user. By this feature, a user may quickly allocate additional value to their preferences without wasting time.

The event stack 301 receives events, such as participant interaction from the graphical user interface for processing by the functions of the gateway system. In one example, the system may store context schema values in a data repository (e.g., a database within or associated with the data center 206) in off-chain storage 207 to store the contextual information. For example, the gateway system may use the context schema to determine a persona type that is authorized to act on the object in its current state. For example, the persona type may be a user authorized to provide validation of a particular record requiring consensus. In one example, the context schema may describe a hierarchy of blockchain object, state, action, persona, role, and other contextual data along with the history of the event. In one example, the user interface 223a may be a web browser application to receive interaction from participants of the gateway system. The gateway system may receive the interactions of the participants with the web browser application at the event stack 301 in the form of events. For example, the gateway system may receive events (from the participants) via the user interface 223a (FIG. 2A). Examples of events received from the user interface 223a may include a user interaction with an object in accordance with its context schema, a request to retrieve state information of an object and parameters of the object, and instructions or parameters for deploying an object. For example, to deploy an object, the gateway system may receive a location identifier indicating where an object must be deployed from the user interface 223a or may retrieve the identifier from off-chain storage 207 as an internal event. In one example, a program may retrieve this information from the off-chain storage 207. The gateway system may process the received events to determine the interaction between a participant and an object. In one example, the gateway system may receive a parameter for the blockchain based on a parameter specification in a context schema. The gateway system may initialize the object with the received parameter. The gateway system may deploy the initialized object to a record storage. The gateway system may also monitor an object, and store and provide information regarding updates to the object. The gateway system 300 further comprises a fund-preference transfer engine 308, which separates allocations based on user indicated preferences. Once the allocated amounts are in a specific associated vault, a batch aggregator 310 adds all the amounts and determines the threshold limit set for the current batch as provided by the batch threshold configure engine 312. Once a batch is filled, the batch-validator/release module 314 ensures that a consensus is reached by all authorized parties, after which the batch is designated a ready for release. All the engines and modules that facilitate the above-described functions are enabled by the processor 318 and the executable code stored in the memory 320.

Figure 4:
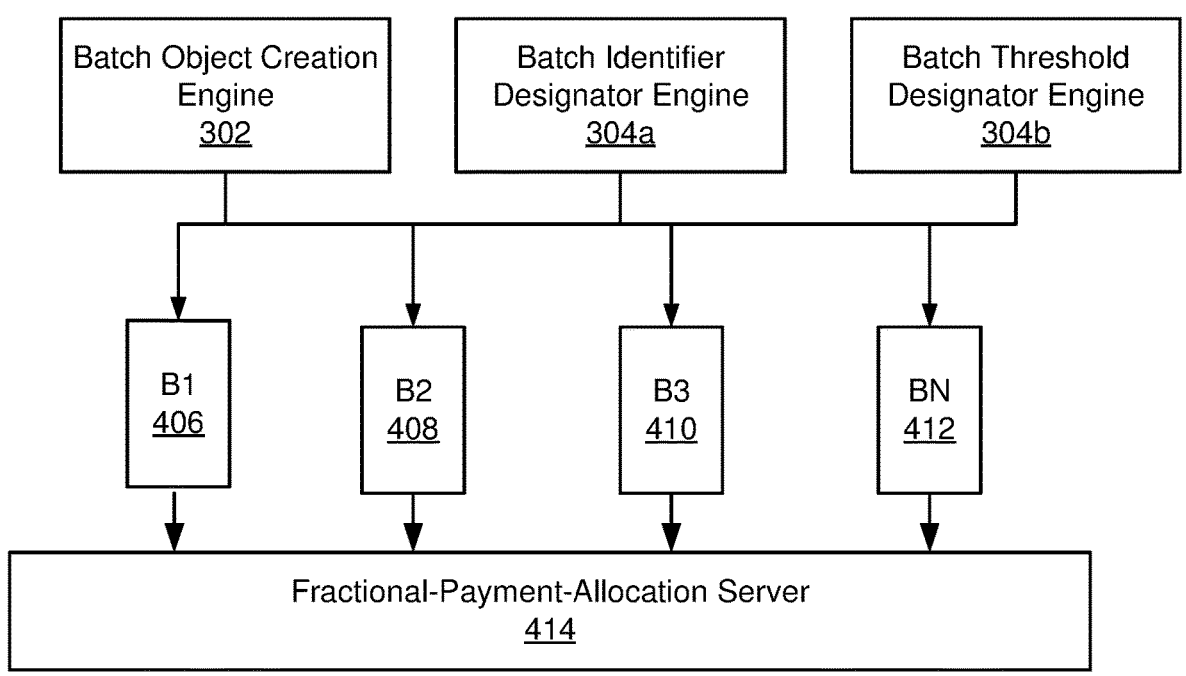
FIG. 4 is a block diagram illustrating various components that create the batches, identify them, and designate threshold limits to them.

Referring now to FIG. 4, the operations disclosed are referenced generally by reference numeral 400. As illustrated, the batch object creation engine 302 creates an object, for example B1, which is designated by a unique identifier ("B1"), by the batch identifier designator engine 304a. It should be recognized that the unique identifier for illustration purposes is designated as "B1." In actual use, the unique identifier may be created in many ways. The object aggregates value until a designated threshold amount is reached, which is designated by the batch threshold designator engine 304b. As illustrated, the batches are sequential, for example "B1," as designated by reference numeral 406, "B2" as designated by reference numeral 408, "B3" as designated by reference numeral 410, and so on through "BN," as designated by reference numeral 412. Once the objects in each batch aggregate the amounts from different users by their preferences, and the batch is ready to release to a target financial structure that has been identified (by the decisioning engine 219), a signal from each batch object alerts a fractional-payment-allocation server 414, the threshold value amount for the batch. The fractional-payment-allocation server 414 verifies that a consensus is reached for each batch and informs an associated banking institution to release the value amount to the target financial institution matched by the decisioning engine 219. In some embodiments the decisioning engine 219 controls a bidding operation for the financial structures competing for value allocation. In this scenario, each financial structure may bid to solicit value packets. The bid includes a set of terms and conditions that must be met by the value packet. In some instances, a plurality of value packets may be bundled to meet a minimum threshold amount of a particular financial structure.

Figure 5:
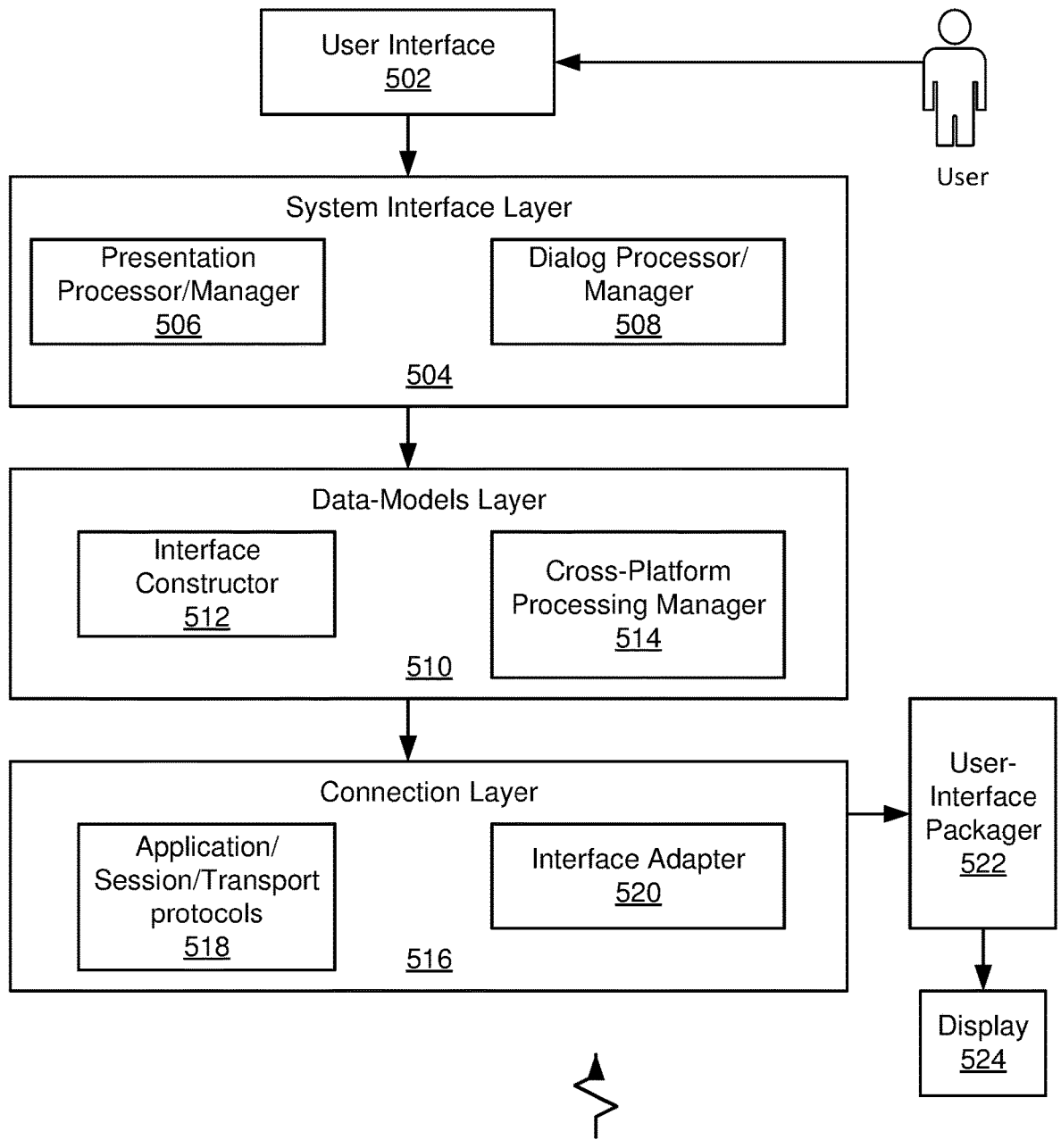
FIG. 5 is an illustration of the user interface layers in the architecture of the dynamic gateway.

Referring now to FIG. 5, the various layers in the architecture are illustrated. The user may be any one of the ones illustrated in FIG. 1. The user communicates with the gateway system via an application programming interface, which the user can access via the user interface 502. Messaging from the user is relayed to the system interface layer 504. The system-interface layer 504 has a presentation process/manager 506 and a dialog processor/manager 508. Both these software modules manage communications at with a front-client as well as other authorized parties that may have a role in providing consensus before records are released. The presentation manager 506 controls presentations provided to users and the dialog manager 508 controls the prompts or scripts provided to the user. Messaging from the system-interface layer 504 flow along a bus to the data-models layer 510, including an interface constructor 512 and cross-platform processing manager 514. The interface constructor 512 dynamically constructs interface connections as required, to connect to users (120a-n in FIG. 1) at the front end and target financial structures (FIG. 1) via the back-end servers. The cross-platform manager 514 processes and manages messaging across platforms. Messaging from the data-models layer 510 flows along a bus to the connection layer 516, which includes application, session, and transport protocols 518 and an interface adaptor 520. The application, session, and transport protocols manager enable compatible communication channels. The connection layer 516 connects to the user interface packager, which assembles and messaging and provides it for display on the display 524.

Figure 6:
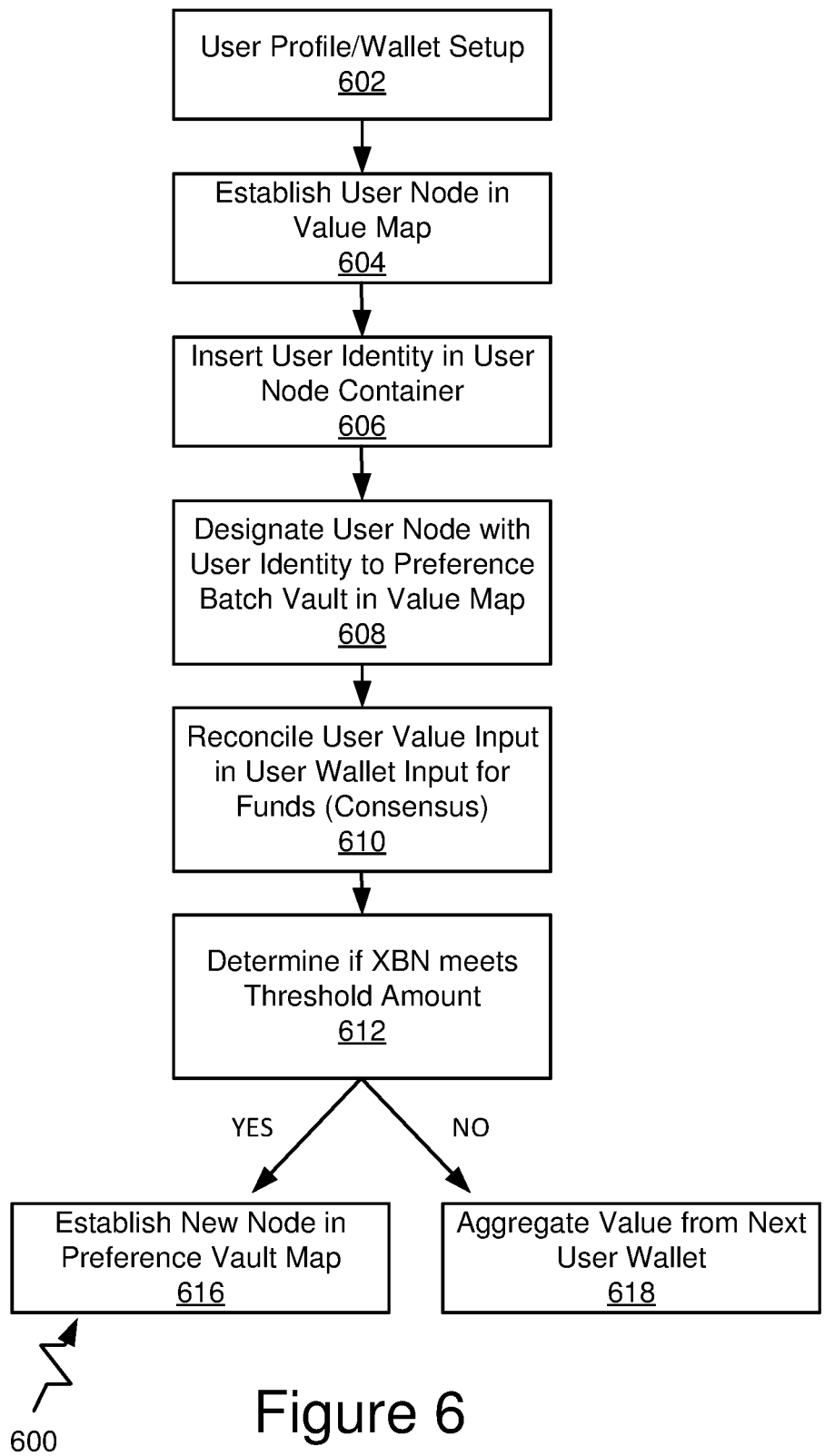
FIG. 6 is a flow chart illustrating the operations of user wallet setup and adding new value nodes in the value map network that is dynamically and continuously generated.

Referring now to FIG. 6, the flow of value is described generally by reference numeral 600. The process 600 starts with a block of operations 602, including one or more operations for users accessing the system via an application programming interface and setting up respective profiles with wallet accounts. Funds in the user wallets are added in the different ways described here. The process 600 flows to the next block of operations 604, including one or more operations for establishing a user node (to represent a user vault) in a value map stored in the system. The process 600 flows to the next block of operations 606, including one or more operations for, inserting user identity in the user node container. Each user node is designated with a user identity based on a preference indicated for a value amount by the user. The value amount for each preference is added to the preference batch vault in the value map. The process 600 flows to the next block of operations 610, including one or more operations for reconciling the user value input (value reported and received) in the user wallet. This requires a consensus operation among user payment processors (e.g., bank, credit card company etc., and gateway financial receiver). Once consensus is reached, this digital transaction may be recorded on a blockchain. The process 600 flows to the next block of operations 612, including one or more operations for determining if the value in a particular batch object ("XBN") meets the threshold amount designated for that batch. If the determination is affirmative, the process 600 flows to the next block of operations 616, including one or more operations, for establishing a new node in the preference vault map. If the answer is negative, the process 600 flows to the next block of operations 618. A value map is generated for each batch that is created for tracking the micro amounts with the identity of the user/investor in each batch.

FIG. 7 illustrates one example of the valve map 700 that is dynamically and continuously created as users create their profiles and accounts with the gateway system. As illustrated, each node has a user vault (or wallet) associated with it, which is a digital transaction record. For example, a first user ("U1") creates a profile and opens an account, at which instance the system reviews the users' preferences for the allocations of value and directs fractional amounts of the full value to preference-batches created by universal preference options that are offered to each user that joins. The illustrated vault map may be used for any preference batch that is created. The vault designation for the first user is ("V1"), therefore, the stored record will indicate "U1V1." The identity of the user is identified in the user designation. The stored record 718 for the first user, assuming the user's name is John Kite, is "JKV1," The other nodes and associated vaults are created for every subsequent user identified by the system. Each is accorded a unique identity. As illustrated, for a second user identified by initials "BA" a second vault is created, "BAV2" to fill the container node "U2V2." Similarly, for a third user identified by initials "BC" a third vault is created, "BCV3" to fill the container node "U3V3;" for a fourth user identified by initials "DE" a fourth vault is created, "DEV4" to fill the container node "U4V4;" for a fifth user identified by initials "JB" a fifth vault ("V5") is created, "IBV5" to fill the container node "USV5;" for a sixth user identified by initials "CA" a sixth vault is created, "CAV6" to fill the container node "U6V6;" for a seventh user identified by initials "CT" a seventh vault is created, "CTV7" to fill the container node "U7V7;" for an eighth user identified by initials "Tn" an eighth vault is created, "TnV8" to fill the container node "U8V8;" for a ninth user identified by initials "JC" a ninth vault is created, "JCV9" to fill the container node "U9V9;" for a tenth user identified by initials "DA" a tenth vault is created, "DAV10" to fill the container node "U10V10;" for an eleventh user identified by initials "DT" an eleventh vault is created, "DTV11" to fill the container node "U11V11;" and for an nth user identified by initials "DN" a nth vault is created, "DNVN" to fill the container node "UNVN." And, so, the nodal map and associated objects with the appropriate digital records are created and recorded after consensus by the authorized parties is given.

Figure 8:
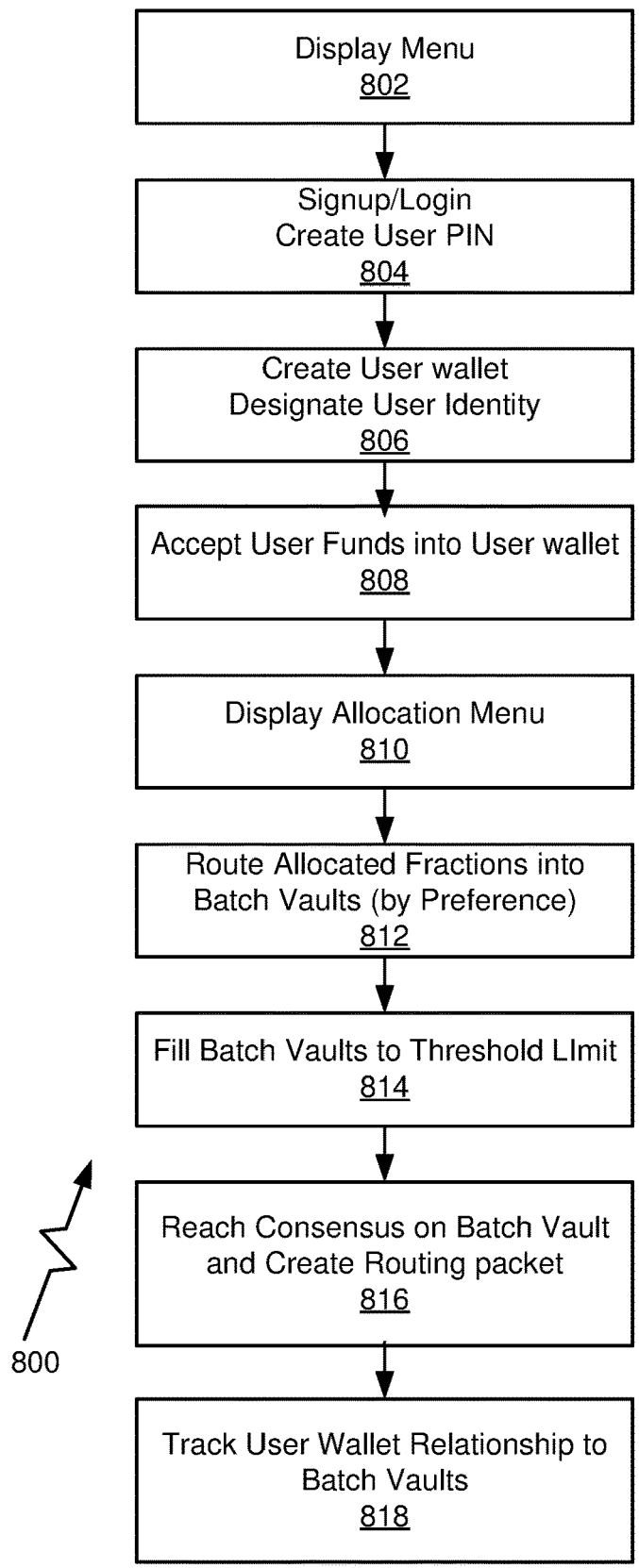
FIG. 8 is a flow chart of the user interface processes at the front end of the client-server architecture of the dynamic gateway.

Referring now to FIG. 8, the operations involved at the front-end user interface are described. The process 800 begins by dynamic display of a menu 802, with prompts and queries requiring a user to create a profile and set up an account with the system. The process 800 proceeds to the next block of operations 804, including one or more operations, for facilitating a signup or login. The process 800, proceeds to the next block 806, including one or more operations for creating a user wallet and designating a user identity. For example, the user identity may be any of the ones described above in FIG. 7. The process 800 flows to the next block 808, at which stage the user would have indicated a value commitment. The process 800 proceeds to the next block 810, at which point, an allocation menu is displayed to the user with preferences on how to a user may allocate fractions of the committed value to personal preferences. The preference options are displayed as part of the display menu 802. User indications of personal preferences are accepted and stored in the first phase of system processing. Once the system has the user allocated fractions, the process 800 flows to the next block 812, including one or more operations for, routing allocated fractions (micro value amounts) into batch vaults based on preference (e.g., long term growth, short term growth, or philanthropic or impact fund). A batch vault for each preference category is sequentially created within the category. For example, in an investment scenario, a preference category may be for long-term investment, or alternatively, for short-term investment. As another example, a preference category may be for investment for a philanthropic purpose. The process 800 flows to the next block of operations 814, including one or more operations for, fill batch vaults to threshold value limits designated for each. As one example, the threshold limits for different batches may be different. For example, the threshold limit may be set based on the size of the container carrying the digital transaction records, based on a threshold limit set by the receiving party etc. The process 600 flows to the next block of operations 816, including one or more operations for, reaching consensus on the batch vault, based on designating authorized parties who should review and reconcile the record and validate it before it is tagged for release. Once it is tagged, the system releases the batch vault into a routing packet. The process 800 flows to the next block of operations 818, including one or more operations for tracking the relationship between the user wallet and the batch vault, to track the fractional allocations and where they are routed.

Referring now to FIG. 9, more details of the user profile setup are described. The process 900 begins at block 902, including one or more operations, for initiating a signup or user login operation when a user arrives on the system's landing page and expresses an interest. The process 900 flows to the next block of operations 904, including one or more operations for querying the user to enter a user name as part of the initial user account setup. The process 900 flows to the next block of operations 906, including one or more operations for, accepting a user name entered by a user. At that point, a digital record for the user is created in the user profile database 922, as user 1 transaction record, designated by reference numeral 924. The various transaction records may be 1 through N to designate the hundreds, thousands, or millions of transaction records. The process 900 flows to the next block of operations 908, including one or more operations for, querying the user to enter a password for initial user account setup. The process 900 flows to the next block of operations 910, at which point a user may enter a password ("PW"). At that point, a record of the user password is recorded in the user profile database 922 as record 926. The various transaction records may be 1 through N to designate the hundreds, thousands, or millions of transaction records with user passwords. The process 900 proceeds to the next block of operations 912, including one or more operations for querying a user to create a PIN for future access (during initial account setup). A record of the user PIN is stored in a record 928 in the user profile database. Again, the illustration of 1-N describes that, hundreds, thousands, millions, or more profiles would have PIN numbers. The process 800 flows to the next block of operations 916, including one or more operations, that will always query the user for the PIN to gain access to the system. Alternative forms of authentication may be utilized. The process flows to the next block of operations 918, including one or more operations for accepting a PIN provided by the user, checking the PIN against a stored PIN number and as illustrated in block 920, providing the user access.

Figure 10:
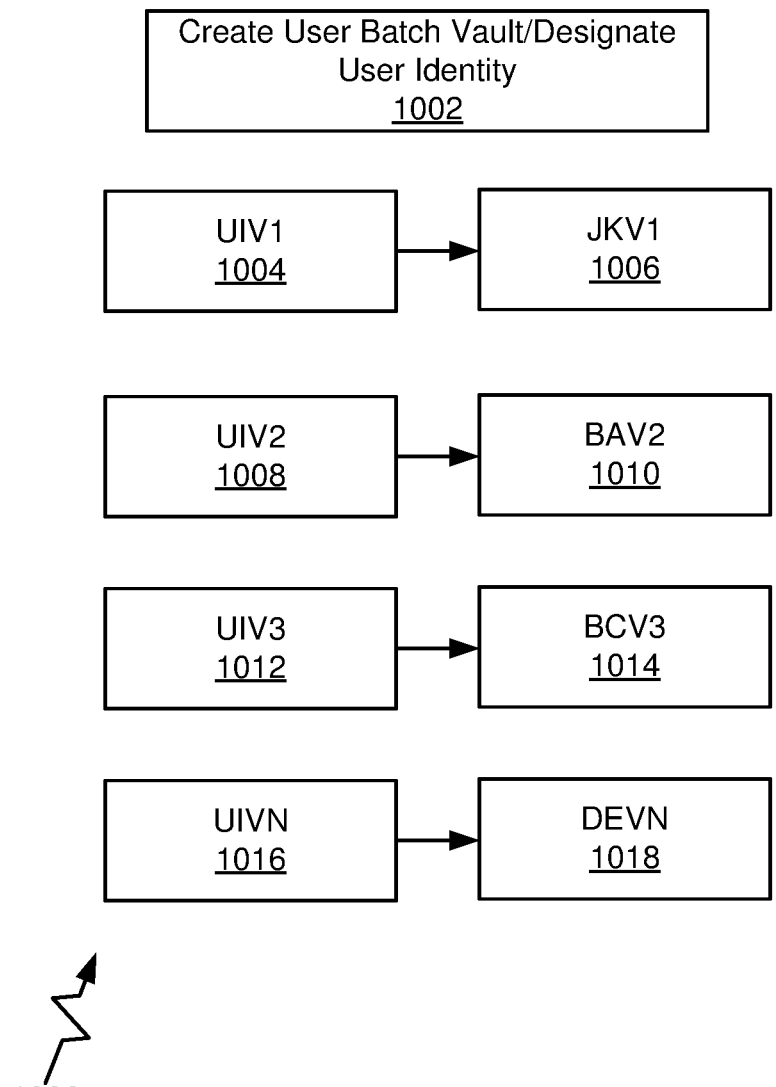
FIG. 10 is a diagrammatic illustration of the linking operation between the user vault and the user identity.

Referring now to FIG. 10, when the user vault node in a batch vault is created, a batch vault network is either initially created or updated if one exists. For example, a user identity ("UI") is also designated for a first user vault created, as indicated in block 1002. For each user batch vault created (U1V1, 1004), a specific user identity is recorded (JKV1, 1006). As another is created for a second user batch vault created (U1V2, 1008), another user identity is recorded (BAV2, 1010), for a third user batch vault (U1V3, 1012), a third user identity is recorded (BCV3, 1014), and so on, until for a nth user batch vault (UIVN, 1016), an nth user identity is recorded (DEVN, 1018).

Figure 11:
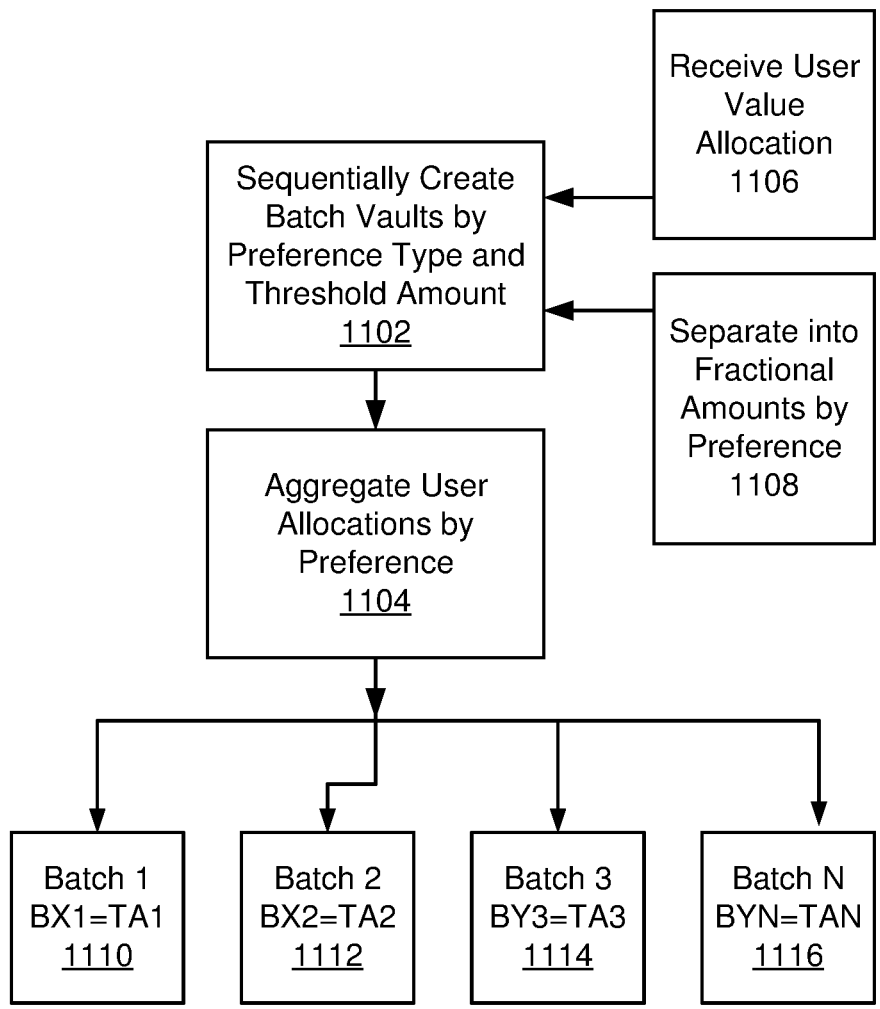
FIG. 11 is a diagrammatic illustration of sequentially creating batch vaults by preference type to meet "set" threshold designations, in each of which value amounts are continuously aggregated.
Figure 11:

Referring now to FIG. 11, as described in block 1102, the batch formation engine 230 (FIG. 2A) of gateway sequentially creates batch vaults by preference type and threshold amount. As one example, in an investment scenario, the system sequentially creates batches B1 through BN, with a unique identifier in the batch numbers that designates the preference type. As one example, a designator "X" may represent an allocation for a short-term investment plan. As another example, a designator "Y" may represent an allocation for a long-term investment plan. In some embodiments, as described by block 1104, the batch value aggregator 232 of the system aggregates fractional amounts allocated by user via their user interface into the batches created by preference type and threshold amount. As described in block 1106, the system receives the user value allocation in the order users confirm their allocations via their accounts. As described in block 1108, the user allocated value is separated by the user preferences. The user-preference-tracking engine 226 tracks the user preference and allocates fractional value components to each preference that is designated. For example, if the user designates 50% to short-term investment and 50% to long-term retirement, the value amount committed by the user is separated into two fractional amounts. The preference batch compiler 228 (FIG. 2A) aggregates the user fractional amounts from users as their preferences are identified and serves as the gateway to route accumulated fractional amounts to separate batches. The batch value aggregator 232 (FIG. 2A) accepts the fractional amounts and aggregates them till the threshold amount is reached. By way of example, the illustrated batches include a first batch, "Batch 1," designated by reference numeral 1110, for preference type "BX" with a threshold amount "TA1." A second batch, "Batch 2," is designated by reference numeral 1112, for preference type "BX" with a threshold amount "TA2." A third batch, "Batch 3," is designated by reference numeral 1114, for preference type "BY" with a threshold amount "TA3." A fourth batch, "Batch N," is designated by reference numeral 1116, for preference type "BY" with a threshold amount "TAN." This illustrates that the threshold amounts for different batches may vary based on various reasons. A threshold amount may be specified by the recipient party. Alternatively, a threshold amount may be dynamically assigned based on a container size. Alternatively, a threshold amount may be assigned based on timing at which specific value amounts are desired at the destination.

Figure 12:
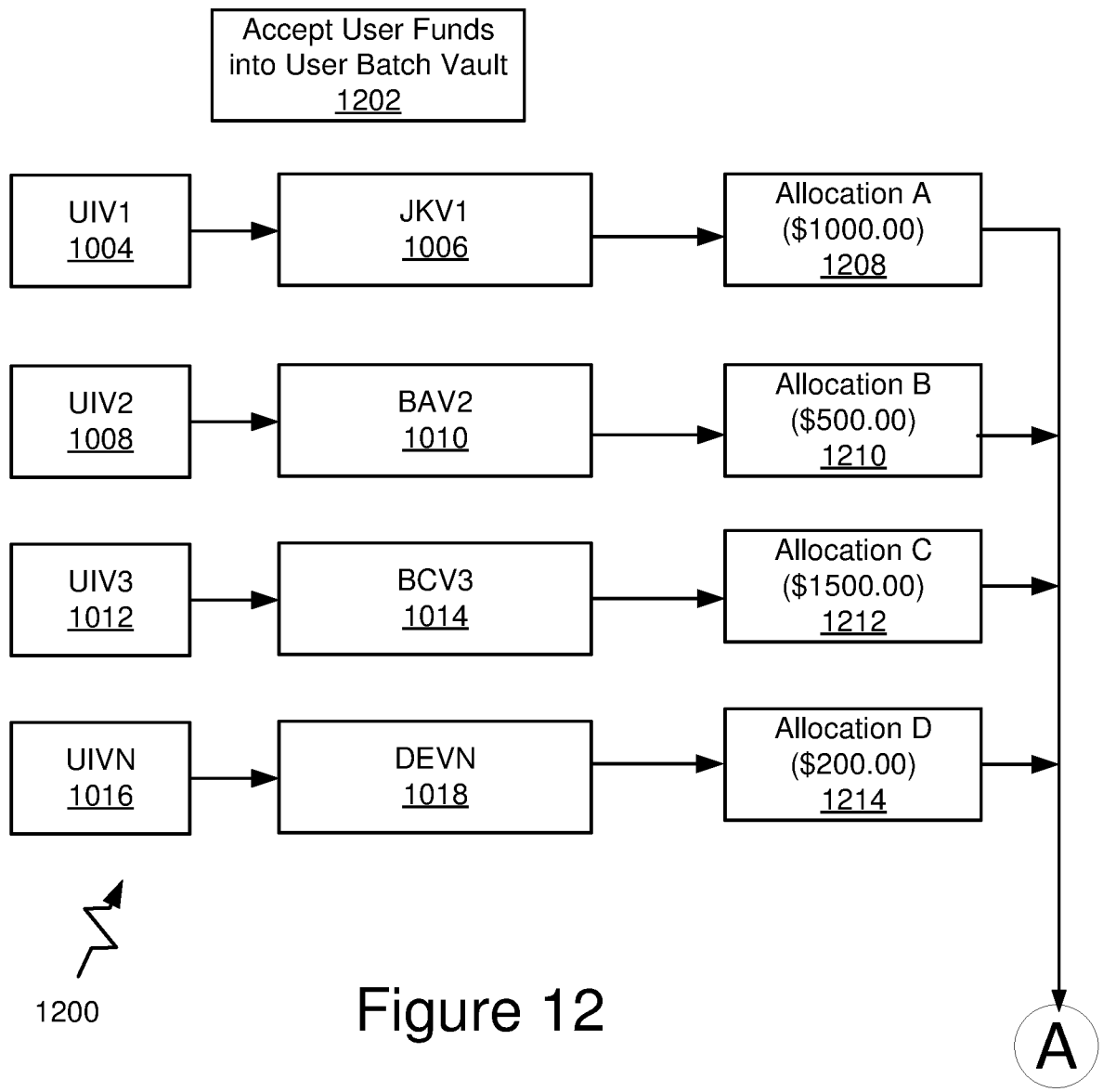
FIG. 12 is a block diagram illustrating the process used to accept user funds into user vaults that are created.

Referring now to FIG. 12 in conjunction with FIG. 10, when the user vault node in a batch vault is created, the user identity is also designated, as indicated in block 1002 (FIG. 10). For each user batch vault created (U1V1, 1004), a specific user identity is recorded (JKV1, 1006). As one example, as described in block 1208, the user identified by the initials J K may allocate an amount A, which is a $1000 in this instance. As another example for a second user batch vault created (U1V2, 1008), another user identity is recorded (BAV2, 1010). The user identified by the initials BA may allocate an amount B (block 1210) in the amount of $500. As another example, for a third user batch vault (U1V3, 1012), a third user identity is recorded (BCV3, 1014). The user BC may allocate an amount C (block 1212), which is $1500 in this instance. As illustrated, this sequence proceeds with a user DE for a nth user batch vault (UIVN, 1016), with an nth user identity recorded (DEVN, 1018). The user DE may elect to allocate an allocation amount D (1214) in the amount of $200.00. The allocated amounts are processed as described in the preceding paragraphs and further in FIG. 13, as illustrated via the connector block A.

Figure 13:
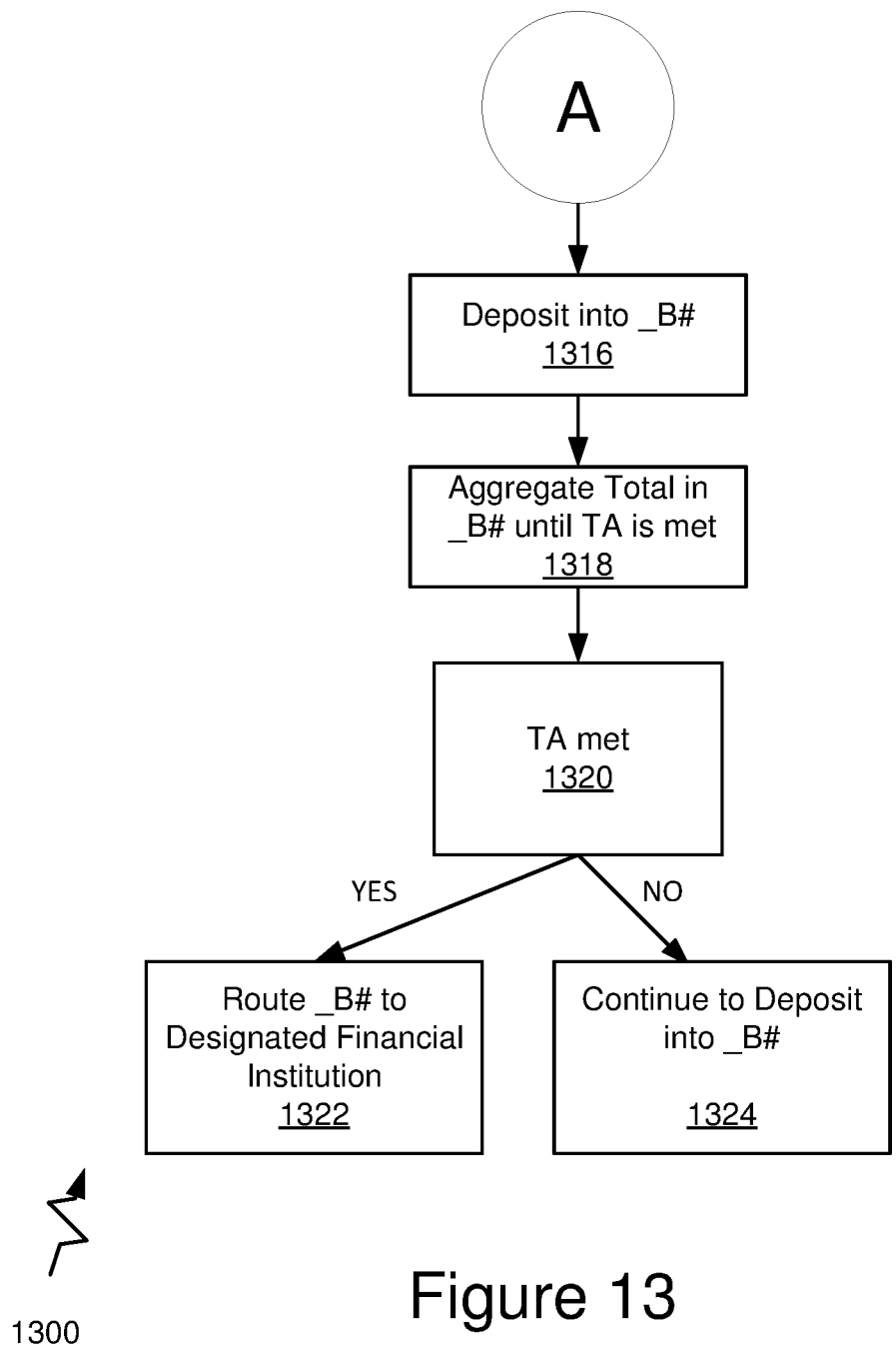
FIG. 13 continues from the operations illustrated in FIG. 12, further illustrating the process of aggregating and routing user funds into vaults divided by preference type.

Referring further to FIG. 13, the allocated amounts flow and are divided into fractional amounts (by preference) and then deposited into a user batch vault (e.g., "UIV1" in FIG. 10), in a particular batch, generally represented here by _BP #. This operation is described in block 1316. The first identifier is a container space for designating the number of user vaults in a particular batch, for example, U1-UN. The second identifier "BP" designates preference type, for example, in the investment scenario, a "short-term" allocation may be represented by "BST." As another example, in the investment scenario, a "long-term" allocation may be represented by "BLT."

As described in block 1318, allocated amounts deposited by users are separated into fractional amounts, which are routed to the appropriate batch and aggregated till the threshold amount is reached. As further described by the block 1320, when the threshold amount is reached, the particular batch is routed to a designated financial institution, as described in block 1322. If a determination in block 1320 is made that the threshold amount is not met, the fractional amounts continue to deposit in the respective batch containers (1324.)

In some instances, the gateway 200 may generate a notification for display to the participant whose action may be impacted by an event. The gateway 200 may receive a response from the participant using the user interface. The gateway 200 may then generate a message blockchain object addressed to the blockchain objects based on the identified event and the response from the participant.

The present technology can take the form of an entirely hardware embodiment, an entirely software embodiment or an implementation containing both hardware and software elements. In some implementations, this technology is implemented in software, which includes but is not limited to, firmware, resident software, microcode, etc.

Finally, the algorithms and displays presented here are not inherently related to any particular computer or other apparatus. Various general-purpose systems may be used with programs in accordance with the teachings herein, or it may prove convenient to construct more specialized apparatuses to perform the required method steps. The required structure for a variety of these systems will appear from the description below. In addition, the present invention is not described with reference to any particular programming language. It will be appreciated that a variety of programming languages may be used to implement the teachings of the invention as described herein.

What is claimed is:

1. A method comprising:

in a computing system coupled to a plurality of different electronic devices via a network, wherein the computing system comprises a payment server including a processor and a memory with executable code configured to generate and execute control actions, comprising:

storing a first plurality of data sets in a modified form about an individual payment in an order received in a plurality of network-based non-transitory storage devices having a collection of data sets stored thereon, wherein a first plurality of data sets about the individual payment includes a micro amount, an allocation preference, an allocation period, and a user identity of an individual transferring the micro amount, wherein the user identity includes a user name, a password, and at least one of a finger-print scan and a facial-recognition image;

providing remote access, by the payment server, to users over the network so any one or more of the users can update the first plurality of data sets about the individual payment in the collection of data sets in real time through a graphical user interface, wherein the one or more of the users updates the first plurality of data sets in a form dependent on a device used by the one or more of the users to a first intelligent program operable with the network configured to create the modified form, the first intelligent program including machine learning instructions to create an event in a sequence to represent a change in a status of the network, by accessing an internal storage, reading a message received in the internal storage from the device used by the one or more of the users about the micro amount and processing data in the message received including the micro amount, wherein the event includes at least the user identity and the micro amount, wherein the event is identified by an event identifier data set and each data set in the plurality of network-based non-transitory storage device includes a hash digest of all data sets on a plurality of event identifiers compiled within each data set, and wherein a header of previous data set is added as a first event in each subsequent data set stored in the plurality of network-based non-transitory storage devices;

converting, by the payment server, the data sets received in the form dependent on the device into the modified form, by separating and storing the data sets into a first plurality of subgroups designated as first allocation-preference pools based on an allocation preference type indicated by each user, via a first allocation-preference-intelligent program including machine learning instructions to create a subsequent event in the sequence to represent another change in the state of the plurality of network-based non-transitory storage devices;

storing modified data sets about the individual payment in the collected data sets;

automatically generating a message containing the modified data sets about the individual payment by the payment server whenever the modified data sets are stored; and transmitting the message to the users over the network in real time, so that each user has immediate access to a modified individual payment;

execute one or more preference search functions over the network, wherein the micro amounts are periodically separated into one or more preference-macro vault containers created in the plurality of network-based non-transitory storage devices, wherein a preference-macro vault container is designated by a unique identifier;

trigger an aggregator operation by using an output from a preference search function to execute a computation function until reaching a designated threshold amount; and marking the preference-macro vault once the designated threshold amount is reached, to execute an action to release the designated threshold amount from the preference-macro vault to a request signal received from a third party server.

2. The method according to claim 1, further comprising:
receiving a second plurality of individual payments from a plurality of different users via a plurality of different electronic devices, each individual payment comprising a second payment amount, an allocation preference designation from a plurality of available preference options, the allocation period, and the user identity;
storing each individual payment received in the plurality of network-based non-transitory storage devices, to a second intelligent program; and
separating the second plurality of individual payments into a second plurality of subgroups designated as allocation-preference pools based on the allocation preference type by each of the different users and recording the second plurality of the subgroups into a second macro vault container created in the plurality of network-based non-transitory storage devices.

3. The method according to claim 1, wherein the currencies used for payment or transfer of value are in at least one of fiat currencies and cryptocurrencies.

4. The method according to claim 1, wherein a micro value amount provided by a plurality of users is via a transfer mechanism linked within a user device to execute transfer of value.

5. The method according to claim 1, wherein a first code set within the first intelligent program requires validation instruction by a specific set of authorized parties via their electronic devices to reach consensus before storing an event in the sequence on the plurality of network-based non-transitory storage devices.

6. The method according to claim 1, wherein a second code set within a second intelligent program requires validation instruction by a specific set of authorized parties via their electronic devices to reach consensus before storing an event in the sequence on the plurality of network-based non-transitory storage devices.

7. The method according to claim 6, wherein the first intelligent program and the second intelligent program in a blockchain are linked and store each event in the sequence as a new data set in the internal storage, wherein each intelligent program includes machine learning instructions that are executable in a secure enclave where data is protected during execution of the machine learning instructions.

8. A dynamic gateway system comprising:
an interface coupled to a plurality of different micro-transaction-transmitter user devices and a plurality of macro-transaction-receiver computing systems enabling receipt of a plurality of data packets across a communication network;
one or more processors coupled to the interface by a system bus;
a memory coupled to the one or more processors and the interface by the system bus, the memory with executable code for driving the one or more processors to execute a plurality of interface actions via engines that store the plurality of data packets on non-transitory storage devices, wherein a plurality of interface actions execute actions by;
a central macro-vault processor of the one or more processors, operable to receive a plurality of data sets representative of micro-transaction portions from the plurality of different micro-transaction-transmitter user devices, each data set representative of the micro-transaction portion conveying a value, an allocation preference, and a user's identity;
a network of non-transitory storage devices coupled to the central macro-vault processor and generating a first record for a first plurality of data sets representative of the micro-transaction portions received, each comprising a payment amount, an allocation preference designation from a plurality of offered preference options, an allocation period, and the user's identity;
a consensus program configured to automatically execute an output action when a group of validators validate transaction data in a secure enclave, the consensus program coupled to a blockchain record generator and the interface and operable to authorize the group of validators required to reach consensus on the first record and recording the first record to a first intelligent program in a first blockchain, the first intelligent program defining a first set of conditions;
a preference batch compiler coupled to the interface, and operable to segregate the data representative of micro-transaction portions by preference allocations into a plurality of allocated-by-preference pools and recording the plurality of the allocated-by-preference pools to a second intelligent program in the first blockchain upon a consensus signal from the group of validators, the second intelligent program defining a second set of conditions;
an event-stacker engine coupled to the interface, and operable to receive a request from any one of a plurality of macro-transaction receivers and initiating an event during which a threshold amount and a set of conditions indicated in the request are aligned with the second intelligent program and upon determining a match, recording a third intelligent program to the first blockchain; and
a release trigger coupled to a payment processor and the interface, and operable to release aggregated value indicated in the second intelligent program to a matched macro-transaction receiver via the payment processor;
a search engine configured to execute one or more preference search functions over the communication network, wherein the micro-transaction portions are periodically separated into one or more preference-macro vault containers in the network of non-transitory storage devices, wherein a preference-macro vault container is designated by a unique identifier;
an aggregator coupled to the search engine, configured to trigger an aggregator operation by using an output from a preference search function to execute a computation function until reaching a designated threshold amount; and
a release trigger coupled to the aggregator, configured to tag the preference-macro vault once the designated threshold amount is reached, to execute an action to release the designated threshold amount from the preference-macro vault.

9. The dynamic gateway system according to claim 8, wherein at least some of the group of validators for the first intelligent program and the second intelligent program are different entities.

10. The dynamic gateway system according to claim 8, wherein the value is expressed by at least one of a fiat currency and a cryptocurrency.

11. The dynamic gateway system according to claim 8, wherein the consensus program consists of a set of self-executing machine-readable instructions associated with the event, wherein the consensus program is assigned a unique address to allow direct communications through messages.

12. The dynamic gateway system according to claim 8, wherein a first code set within the first intelligent program requires validation by a specific set of authorized parties to reach consensus before storing in a first container in the network of non-transitory storage devices.

13. The dynamic gateway system according to claim 8, wherein a second code set within the second intelligent program requires validation by a specific set of authorized parties to reach consensus before storing in a first container in the network of non-transitory storage devices.

14. The dynamic gateway system according to claim 8, wherein the first intelligent program and the second intelligent program are linked.

15. The method according to claim 1, wherein data sets are stored to establish a plurality of different user nodes in a value map and the data sets are stored in a first object at a first node in the value map stored in the network-based non-transitory storage devices, wherein the data sets are stored after executing the first intelligent program defining a first set of conditions and requesting an action from a group of validator entities with access to the first intelligent program within a secure enclave defined within the network.

16. The method according to claim 15, wherein segregate the data sets are segregated by the preference allocation and to compile preference-based sub data sets, wherein the preference-based sub data sets are recorded after executing a second intelligent program defining a second set of conditions including a threshold value amount.

17. The method according to claim 16, wherein the first plurality of data sets received from users are stored in user wallet containers.

18. The method according to claim 15, wherein new nodes in the value map are continuously and dynamically added as the users provide input via a unified interface presenting a plurality of quick-click options to each user of the plurality of different electronic devices.

19. A computing system coupled to a plurality of different electronic devices via a network, wherein the computing system comprises a payment server including a processor and a memory with executable code configured to generate and execute control actions to:
   storing a first plurality of data sets in a modified form about an individual payment in an order received in a plurality of network-based non-transitory storage devices having a collection of data sets stored thereon, wherein the first plurality of data sets about the individual payment includes a micro amount, an allocation preference, an allocation period, and a user identity of an individual transferring the micro amount, wherein the user identity includes a user name, a password, and at least one of a finger-print scan and a facial-recognition image;
   providing remote access, by the payment server, to users over the network so any one or more of the users can update the first plurality of data sets about the individual payment in the collection of data sets in real time through a graphical user interface, wherein the one or more of the users updates the first plurality of data sets in a form dependent on a device used by the one or more of the users to a first intelligent program operable with the network configured to create the modified form, the first intelligent program including machine learning instructions to create an event in a sequence to represent a change in a status of the network, by accessing an internal storage, reading a message received in the internal storage from the device used by the one or more of the users about the micro amount and processing data in the message received including the micro amount, wherein the event includes at least the user identity and the micro amount, wherein the event is identified by an event identifier data set and each data set in the plurality of network-based non-transitory storage device includes a hash digest of all data sets on a plurality of event identifiers compiled within each data set, and wherein a header of previous data set is added as a first event in each subsequent data set stored in the plurality of network-based non-transitory storage devices;
   converting, by the payment server, the data sets received in the form dependent on the device into the modified form, by separating and storing the data sets into a first plurality of subgroups designated as first allocation-preference pools based on an allocation preference type indicated by each user, via a first allocation-preference-intelligent program including machine learning instructions to create a subsequent event in the sequence to represent another change in the state of the plurality of network-based non-transitory storage devices;
   storing modified data sets about the individual payment in the collected data sets;
   automatically generating a message containing the modified data sets about the individual payment by the payment server whenever the modified data sets are stored; and
   transmitting the message to all the users over the network in real time, so that each user has immediate access to a modified individual payment;
   execute one or more preference search functions over the network, wherein the micro amounts are periodically separated into one or more preference-macro vault containers created in the plurality of network-based non-transitory storage devices, wherein a preference-macro vault container is designated by a unique identifier;
   trigger an aggregator operation by using an output from a preference search function to execute a computation function until reaching a designated threshold amount; and
   marking the preference-macro vault once the designated threshold amount is reached, to execute an action to release the designated threshold amount from the preference-macro vault to a request signal received from a third party server.

20. A computing system according to claim 19, wherein the memory with executable code is further configured to generate and execute control actions to:
   generate a value map with a plurality of different user nodes in the value map and recording different micro-value transaction amounts in a first object at a first node in the value map, wherein the value map is stored in a database, wherein the different micro-value transaction amounts are stored after executing a first intelligent program defining a first set of conditions and requesting an action from one or more validator entities with access to the intelligent program within a secure enclave defined within a communication network;
   segregating the data packets by the preference allocation and compile preference-based sub data sets, and record the preference-based sub data sets after executing a second intelligent program defining a second set of conditions including a threshold value amount;

aggregating micro value of the preference-based sub data sets by executing a third intelligent program until a total aggregated value meets a threshold value amount;

transmitting the preference-based sub data sets to a macro vault container when an event is triggered by the third intelligent program to release the sub data sets and record the event and the release of the sub data sets; and releasing aggregated value indicated in the second intelligent program to a designated banking entity.

* * * * *